United States Patent
Hirano et al.

(10) Patent No.: US 7,957,344 B2
(45) Date of Patent: Jun. 7, 2011

(54) PATH SETTING METHOD, MOBILE TERMINAL, AND PATH MANAGING DEVICE

(75) Inventors: Jun Hirano, Kanagawa (JP); Takako Hori, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1075 days.

(21) Appl. No.: 11/658,498

(22) PCT Filed: Jul. 28, 2005

(86) PCT No.: PCT/JP2005/013862
§ 371 (c)(1),
(2), (4) Date: Apr. 25, 2007

(87) PCT Pub. No.: WO2006/011567
PCT Pub. Date: Feb. 2, 2006

(65) Prior Publication Data
US 2008/0101289 A1    May 1, 2008

(30) Foreign Application Priority Data

Jul. 30, 2004  (JP) ................................ 2004-224656

(51) Int. Cl.
*H04B 7/212* (2006.01)
(52) U.S. Cl. ........ 370/329; 370/331; 370/338; 709/227; 709/249
(58) Field of Classification Search .................. 370/329, 370/331
See application file for complete search history.

(56) References Cited

U.S. PATENT DOCUMENTS

| | | | |
|---|---|---|---|
| 6,643,279 B1 * | 11/2003 | Li et al. .......................... | 370/331 |
| 6,661,782 B1 * | 12/2003 | Mustajarvi et al. ........... | 370/331 |
| 7,177,646 B2 * | 2/2007 | O'Neill et al. ................ | 455/450 |
| 7,362,727 B1 * | 4/2008 | O'Neill et al. ................ | 370/331 |
| 7,453,851 B2 * | 11/2008 | Westphal et al. .............. | 370/331 |
| 7,680,079 B2 * | 3/2010 | Jeong et al. ................... | 370/331 |
| 7,684,392 B2 * | 3/2010 | Saito et al. .................... | 370/389 |

(Continued)

FOREIGN PATENT DOCUMENTS

JP       2003258858       9/2003

(Continued)

OTHER PUBLICATIONS

PCT International Search Report dated Aug. 30, 2005.

(Continued)

*Primary Examiner* — Charles Shedrick
(74) *Attorney, Agent, or Firm* — Dickinson Wright PLLC

(57) ABSTRACT

A technique is disclosed, by which a mobile terminal (mobile node) performing handover can quickly and continuously receive after the handover the additional services as it has been receiving before the handover. According to this technique, MN (mobile node; mobile terminal) 10 transmits a message including a session identifier or the like of a path 24 to QNE (proxy) 68 under the condition connected to AR (access router) 21 before the handover. QNE 62 and QNE 63 on a path 34 where this message is transferred are present on the path 24, and its own interface address is added to the message. On the other hand, QNE 67 is not present on the path 24 and transfers the message as it is. As a result, QNE (proxy) 68 determines QNE 63 as a crossover node and turns the path upstream from QNE 63 to an identical path, while a path 35 as changed from a downstream path can be set as a path to be used by MN after the handover.

15 Claims, 13 Drawing Sheets

U.S. PATENT DOCUMENTS

| | | |
|---|---|---|
| 2003/0169719 A1 | 9/2003 | Isobe et al. |
| 2003/0225892 A1 | 12/2003 | Takusagawa et al. |
| 2004/0117508 A1* | 6/2004 | Shimizu .................. 709/249 |
| 2008/0137625 A1* | 6/2008 | Hori et al. .................. 370/338 |
| 2009/0190551 A1* | 7/2009 | Hori et al. .................. 370/331 |
| 2009/0207782 A1* | 8/2009 | Cheng et al. .................. 370/328 |

FOREIGN PATENT DOCUMENTS

| | | |
|---|---|---|
| JP | 2003259418 | 9/2003 |
| JP | 200415143 | 1/2004 |

OTHER PUBLICATIONS

Shin'ichi Isobe, et al.; "Cross ovor Router ni Okeru Buffering Handover Seigyo." Information Processing Society of Japan Kenkyu Hokoku, 2002-AVM-38-10, Nov. 14, 2002, 3.4., Cross over Router Kettei Algorithm.

D. Johnson, et al.: "Mobility Support in IPv6," draft-ietf-mobileip-ipv6-24.txt, Jun. 2003, pp. 1-172.

R. Koodli, ed.: "Fast Handovers for Mobile IPv6," draft-ietf-mobileip-fast-mipv6-08.txt, Oct. 10, 2003, pp. i-ii and 1-36.

R. Braden, et al.: "Resource ReSerVation Protocol (RSVP)—Version 1 Functional Specification," RFC 2205, Sep. 1997, pp. 1-112.

H. Chaskar, ed.: "Requirements of a Quality of Service (Qos) Solution for Mobile IP," RFC3583, Sep. 2003, pp. 1-10.

S. Van den Bosch, et al.: "NSLP for Quality-of-Service signaling," draft-ietf-nsis-qos-nslp-01.txt, Oct. 2003, pp. 1-31.

X. Fu, et al.: "Mobility Issues in Next Steps in Signaling (NSIS)," draft-fu-nsis-mobility-01.txt, Oct. 17, 2003, pp. 1-31.

R. Bless, et al.: "Mobility and Internet Signaling Protocols," draft-manyfolks-signaling-protocol-mobility-00.txt, Jan. 2004, pp. 1-58.

R. Hancock, et al.: "Next Steps in Signaling: Framework," draft-ietf-nsis-fw-05.txt, Oct. 2003, pp. 1-45.

T. Sanda, et al.: "A Proposal for Seamless QoS Support in Mobile Networks," The Institute of Electronics, Information and Communication Engineers; Mobile Multi-Media Communications, MoMuC2004-23, May 2004, pp. 59-64.

T. Ue, et al.: "QoS Mibility Support with Proxy-assisted Fast Crossover Node Discovery," The Seventh International Symposium on Wireless Personal Multimedia Communications 2004 (WPMC 2004), Abano Terme, Italy, Sep. 14, 2004, 5 pages.

* cited by examiner

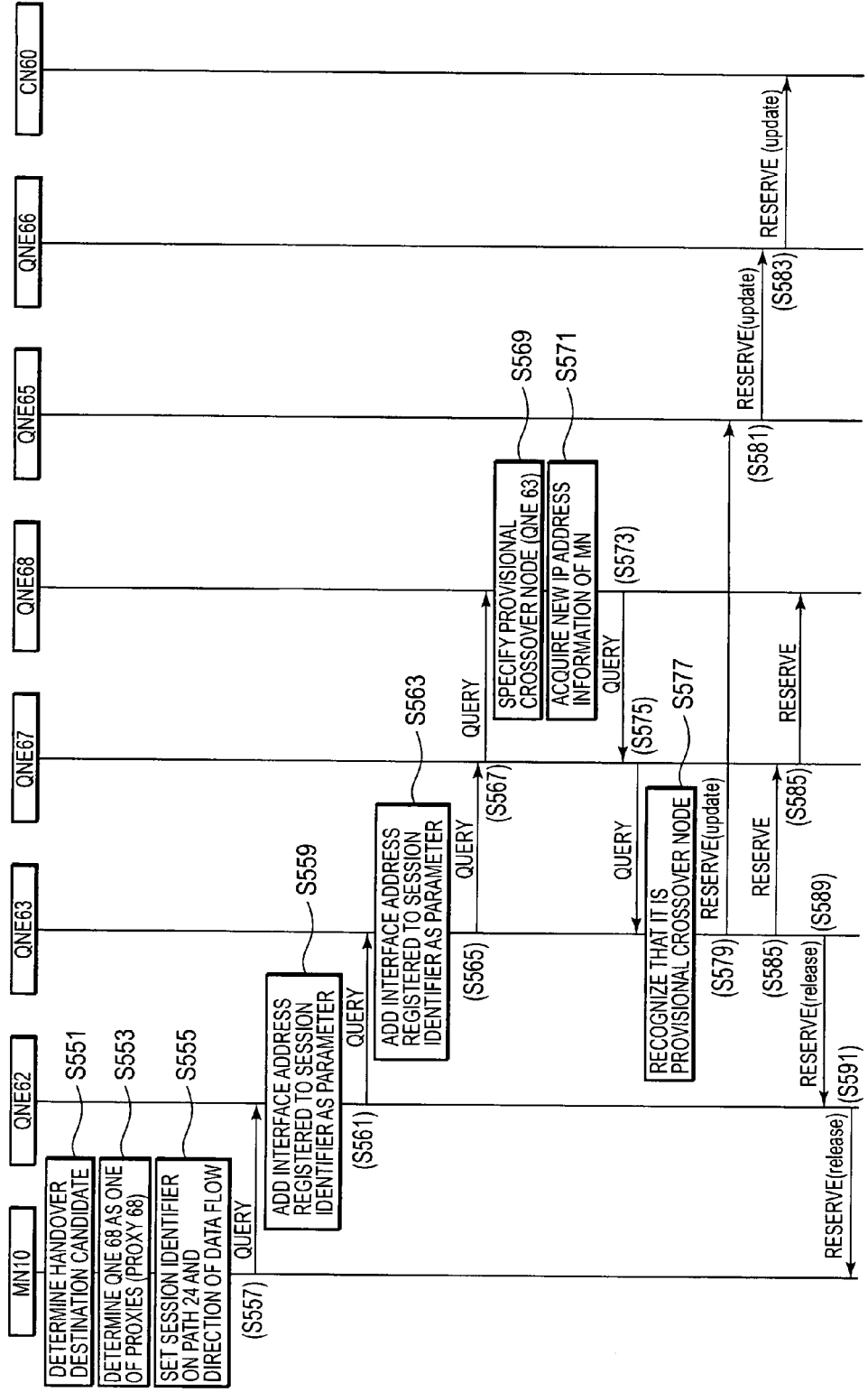

FIG. 14

| | | | | | |
|---|---|---|---|---|---|
| ... | ... | ... | ... | ... | 41 AP-AR MATCHING INFORMATION |
| MATCHING INFORMATION OF AP22-AR21 | LINK LAYER ADDRESS OF AP 22 | LINK LAYER ADDRESS OF AR 21 | NETWORK PREFIX OF SUBNET 20 | PREFIX LENGTH OF SUBNET 20 | |
| MATCHING INFORMATION OF AP23-AR21 | LINK LAYER ADDRESS OF AP 23 | LINK LAYER ADDRESS OF AR 21 | NETWORK PREFIX OF SUBNET 20 | PREFIX LENGTH OF SUBNET 20 | |
| MATCHING INFORMATION OF AP32-AR31 | LINK LAYER ADDRESS OF AP 32 | LINK LAYER ADDRESS OF AR 31 | NETWORK PREFIX OF SUBNET 30 | PREFIX LENGTH OF SUBNET 30 | |
| MATCHING INFORMATION OF AP33-AR31 | LINK LAYER ADDRESS OF AP 33 | LINK LAYER ADDRESS OF AR 31 | NETWORK PREFIX OF SUBNET 30 | PREFIX LENGTH OF SUBNET 30 | |
| ... | ... | ... | ... | ... | | ed
PATH SETTING METHOD, MOBILE TERMINAL, AND PATH MANAGING DEVICE

FIELD OF THE INVENTION

The present invention relates to a new path setting method, a mobile terminal (mobile node), and a path managing device for setting a path (e.g. a QoS path) used by a mobile node during handover when the mobile node performs radio communication. In particular, the invention relates to a new path setting method, a mobile terminal (mobile node), and a path managing device for setting a path (e.g. a QoS path) used by the mobile node during handover when the mobile node performs radio communication using Mobile IPv6 (Mobile Internet Protocol version 6), which is Internet protocol of the next generation.

BACKGROUND ART

As a technique to provide seamless connection of communication network even while moving to users, who want to have access to the communication network such as Internet from a mobile terminal (mobile node) via radio network, a technique is now propagating, which uses mobile IPv6, i.e. the next generation Internet protocol. Now, referring to FIG. 5, description will be given below on a radio communication system using this mobile IPv6. The technique of mobile IPv6 as described here is disclosed, for instance, in the Non-Patent Document 1 as given below.

The radio communication system shown in FIG. 5 comprises an IP network (communication network) 15 such as Internet, a plurality of subnets (also called sub-networks) 20 and 30 connected to the IP network 15, and a mobile terminal (MN: mobile node) 10, which can be connected to one of the plurality of subnets 20 and 30. In FIG. 5, two subnets 20 and 30 are shown as the plurality of subnets 20 and 30.

The subnet 20 comprises an access router (AR) 21 to perform routing to IP packet (packet data) and a plurality of access points (APs) 22 and 23, which constitute specific radio coverage areas (communicatable areas) 28 and 29 respectively. These APs 22 and 23 are connected to AR 21 respectively, and AR 21 is connected to the IP network 15. In FIG. 5, two APs 22 and 23 are shown as the plurality of APs 22 and 23. Also, the subnet 30 comprises AR 31 and a plurality of APs 32 and 33 and has also the same connection aspect as that of the subnet 20.

AR 21 is a component element of the subnet 20 and AR 31 is a component element of the subnet 30, and these can perform communication with each other via the IP network 15. That is, the subnet 20 and the subnet 30 are connected with each other via the IP network 15.

Here, it is supposed that MN 10 initiates radio communication with AP 23 within the radio coverage area 29 in the radio communication system shown in FIG. 5. In this case, if IPv6 address assigned to MN 10 is not suitable to IP address system of the subnet 20, MN 10, which is present in the radio coverage area 29, acquires an IPv6 address suitable for the subnet 20, i.e. care of address (CoA), via radio communication with AP 23.

As the methods, by which MN 10 acquires CoA, there are: a method, according to which CoA is assigned in stateful condition from a DHCP server by the procedure such as DHCPv6 (Dynamic Host Configuration Protocol for IPv6), and a method for automatically generating CoA in stateless condition by acquiring network prefix and prefix length of the subnet 20 from AR 21 and by combining the network prefix and the prefix length acquired from AR 21 with a link layer address of MN 10.

Then, MN 10 can transmit or receive packet data in the subnet 20 by registering the acquired CoA (Binding update (BU)) to a router (home agent) on its own home network or to a specific correspondent node (CN).

As a result, the packet data transmitted from a predetermined correspondent node to MN 10 is transmitted to MN 10 via AR 21 and AP 23, and the packet data transmitted by MN 10 to the correspondent node is delivered to the correspondent node via AP 23 and AR 21. Also, the packet data transmitted to MN 10 via home network is sent to AR 21 of the subnet 20 according to CoA of MN 10 registered at the home agent is delivered to MN 10 via AP 23.

As described above, the radio communication system using mobile IPv6 as shown in FIG. 5 is so arranged that radio communication at MN 10 can be continued by using CoA even when MN 10 performs handover from the subnet where MN 10 is present to another subnet. As a technique to perform this handover processing at high speed, a fast handover technique disclosed in the Non-Patent Document 2 as given below is known, for instance.

In this fast handover technique, MN 10 acquires a new CoA (hereinafter referred as "NCoA") in advance, which is to be used in the subnet 30 before MN 10 performs L2 handover, and by notifying this NCoA to AR 21, a tunnel can be generated between AR 21 and AR 31. Even during the period for the switchover of the connection from AP 23 to AP 32 in the L2 handover by MN 10 to official registration (BU) of NCoA acquired in advance after moving to the subnet 30, the packet data sent to previous CoA (hereinafter referred as "PCoA") of MN 10 as used in the subnet 20 can be transferred to MN 10 via the tunnel and via AR 31 and AP 32. Also, the packet data transmitted from MN 10 can reach AR 21 via the tunnel through AP 32 and AR 31 and can be sent from AR 21 to the correspondent node.

On the other hand, in the communication using the network, there are provided services such as QoS (Quality of Service) guarantee (in this specification, these services are referred as "additional services"), and there are various types of communication protocols to realize the additional services. Among these various types of communication protocols, there is RSVP (Resource Reservation Protocol), for instance, as a protocol for providing QoS guarantee (e.g. see the Non-Patent Document 3 as given below). RSVP ensures that the data are transmitted smoothly from a transmission side communication terminal to a receiving side communication terminal by making band reservation on a flow to transmit the data from the transmission side communication terminal to the receiving side communication terminal for receiving data.

On MN 10, which performs handover between the subnets 20 and 30, there are demands that additional services such as QoS guarantee, which has been received before the handover, should be received continuously after the handover. RSVP as described above cannot meet the demands—particularly, in the points as given below, and it cannot cope with the moving of MN 10. FIG. 6 is a schematical drawing to explain that the RSVP based on the prior art cannot cope with the moving of MN.

In RSVP, QoS path is set up on an end-to-end path from a correspondent node (CN) 60 to MN 10, and data transfer is performed by a plurality of relay nodes 61, which connect the points on the end-to-end path based on addresses of MN 10 and CN 60. Therefore, when MN 10 performs handover between the subnets 20 and 30 and CoA of MN 10 has been changed, a processing relating to address change must be carried out in addition to the change of flow on QoS path. RSVP cannot cope with such change, and the QoS guarantee cannot be fulfilled as a result (a first problem: difficulty to change QoS path). Further, even when QoS path is set up newly, if overlapping occurs on QoS path before and after the handover, double reservation may be made on the overlapping portion (a second problem: double resource reservation).

To solve the problem as described above, discussions are currently going on to standardize a new protocol called NSIS (Next Step in Signaling) in IETF (Internet Engineering Task Force). Much expectation is put on NSIS as it is particularly effective for various types of additional services such as QoS guarantee, and there are documents where the requirements to realize QoS guarantee or mobility support in NSIS or the methods to attain the purpose are described (e.g. Non-Patent Documents 4-8 as given below). Description will be given now on general features of NSIS, which is currently a draft specification by NSIS working group of IETF, and on the method to establish QoS path (see Non-Patent Document 5 and Non-Patent Document 8).

FIG. 7 shows protocol stack of NSIS and its lower layer to explain the protocol arrangement of NSIS in the prior art. NSIS protocol layer is positioned immediately above IP and lower layer. Further, the NSIS protocol layer consists of two layers: NSLP (NSIS Signaling Layer Protocol), which is a protocol for generation and processing of signaling message to provide additional services, and NTLP (NSIS Transport Layer Protocol) to perform routing of signaling message of NSLP. There are various types of NSLPs: NSLP for QoS (QoS NSLP), and NSLP for other additional services (service A and service B) (NSLP for service A, NSLP for service B), etc.

FIG. 8 is a schematical drawing to explain the concept that NE and QNE, i.e. nodes of NSIS in the prior art, are "adjacent to each other". As shown in FIG. 8, at least NTLP is packaged in all nodes with NSIS functions (NE: NSIS Entity). Above this NTLP, NSLP may not be necessarily provided, or one or more NSLPs may be present. Here, NE having NSLP for QoS is referred as QNE (QoS NSIS Entity). A node (terminal) or a router is entitled to become NE. Also, among NEs adjacent to each other, there may be a plurality of routers, which are not NE. Further, among QNEs adjacent to each other, a plurality of routers, which are not NE or a plurality of NEs without QoS NSLP may be present.

Next, description will be given on an example of a conventional method to establish QoS path by referring to FIG. 9. It is supposed here that MN 10 connected to AR 21 in the subnet 20 is scheduled to receive the data from CN 60 or is receiving (currently receiving) the data for a certain purpose (session). When establishing the QoS path, MN 10 transmits a RESERVE message to establish QoS path to CN 60. This RESERVE message contains a QoS information (Qspec) as desired for the receiving of the data from CN 60. The transmitted RESERVE message passes through AR 21 and QNE 62 and other routers without NSIS functions (not shown) and reaches QNE 63. NSLP of QNE 63 reserves QoS resource described in Qspec included in the RESERVE message for this session. After passing through QNE 63, the RESERVE message reaches QNE 65 via NE 64 and other routers without NSIS functions (not shown). At QNE 65, also, the same processing as in QNE 63 is performed, and QoS resource reservation is made. This procedure is repeated. Finally, when the RESERVE message reaches QNE 60, QoS path is established between MN 10 and CN 60.

To identify the resource reservation, a flow identifier and a session identifier are used. The flow identifier depends on CoA of MN 10 or IP address of CN 60. Each of QNE 63 and QNE 65 can know whether resource reservation for the data packet is present or not by confirming IP addresses of transmission source and transmission destination of each data packet. In case MN 10 moves to the other subnet and CoA is changed, the flow identifier is also changed to cope with the change of CoA of MN 10. On the other hand, the session identifier is to identify a series of data transmission for the session, and, unlike the case of the flow identifier, it is not changed in association with the moving terminal.

There is a method called as QUERY as a method to check the availability of QoS resource to an arbitrary path. This is a method to check in advance whether a desired Qspec can be reserved by each QNE when QoS path is established from MN 10 to CN 60, for instance. A QUERY message to check whether the desired Qspec can be reserved or not by QNE is transmitted, and the result can be received by a RESPONSE message, which is a response to the QUERY message. Current resource reservation condition does not change due to the QUERY message and the RESPONSE message. In order that a QNE gives some notification to other QUE, a NOTIFY message can be used. This NOTIFY message is used for the purpose such as notification of error. RESERVE message, QUERY message, RESPONSE message and NOTIFY message are the messages of NSLP for QoS guarantee, and these are described in the Non-Patent Document 5.

Also, QUERY is used not only to check the availability of QoS resource but also to check the path for resource reservation in advance. That is, by sending a QUERY message from data transmission side to the data receiving side, it is possible to specify the path where the data may pass. The resource reservation is performed to QNE on the path specified by this QUERY.

However, in actual network, it is possible that the data path is deviated from the path where resource reservation has been made. No discussion has been made almost at all on how to avoid this, while, in the Non-Patent Document 8 as given below, a method such as route pinning to fix the path where the data passes is given as one of the measures to solve the problem.

Next, referring to FIG. 10, description will be given on a method to avoid double resource reservation when MN 10 has moved from the subnet 20 to the subnet 30 in the prior art. When MN 10 is receiving data from CN 60 and when QoS path (path 124) is established, QoS resources as desired by MN 10 are reserved at QNE 63, QNE 65 and QNE 66. It is assumed here that the flow identifier and the session identifier in this case are X and Y respectively. Actually, current IP address of MN 10 and IP address of CN 60 are contained in the flow identifier X. Also, an arbitrary numerical value high enough is set in the session identifier Y. Under this condition, after MN 10 has moved to the subnet 30, a RESERVE message is sent to CN 60 to establish a new QoS path. The previous path (path 124) is not immediately released after the moving of MN 10.

As already described, the flow identifier is changed in association with the moving of MN 10. Thus, the flow identifier X in the path 124 and the flow identifier in the path 134 (the flow identifier in the path 134 is referred as Z) are different from each other. Because there is no resource reservation to the session identifier Y in any of the interfaces, QNE 67 judges that a new path has been established, and resource reservation is made to the flow identifier Z and the session identifier Y. On the other hand, resource reservation to the session identifier Y is present at QNE 65 and QNE 66. QNE 65 and QNE 66 compare the flow identifier X with the flow identifier Z. If it is confirmed that the flow identifier has changed from X to Z, it is judged that a new path has been established due to the moving of MN 10. To avoid double reservation, means are taken to update the previous reservation by making new resource reservation. A QNE, where a previous path and a new path begin to cross over, is called a crossover node (CRN). CRN may indicate a router where the paths actually cross over (NE 64 in FIG. 10). When discussion is made on QoS path, it relates to a QNE (QNE 65 in FIG. 10) where one of adjacent QNEs (QNE 66 in FIG. 10) is the same but another of the adjacent QNEs (QNE 63 and QNE 67 in FIG. 10) is different in the previous path (path 124) and the new path (path 134).

According to the Non-Patent Document 5 or the Non-Patent Document 8, in the RESERVE message, in the QUERY message and in the NOTIFY message, not only the terminals at the end (MN 10 and CN 60), which are transmission destination or transmission source of the data packet, but also an arbitrary QUE may also become the transmission source.

NSIS covers various types of functions not only in mobile environment, but also in normal static network. In the present specification, special notice is given on the functions to actualize the establishment of additional services supported by mobility support, which is one of the functions of NSIS, and it is assumed that the additional services under mobility support can be achieved by the packaging of NSIS.

[Non-Patent Document 1] D. Johnson, C. Perkins and J. Arkko, "Mobility Support in IPv6", draft-ietf-mobileip-ipv6-24, June 2003

[Non-Patent Document 2] Rajeev Koodli "Fast Handovers for Mobile IPv6", draft-ietf-mobileip-fast-mipv6-08, October 2003

[Non-Patent Document 3] R. Braden, L. Zhang, S. Berson, S. Herzog and S. Jamin, "Resource ReSerVation Protocol—Version 1 Functional Specification", RFC 2205, September 1997.

[Non-Patent Document 4] H. Chaskar, Ed, "Requirements of a Quality of Service (QoS) Solution for Mobile IP", RFC3583, September 2003

[Non-Patent Document 5] Sven Van den Bosch, Georgios Karagiannis and Andrew McDonald "NSLP for Quality-of-Service signalling", draft-ietf-nsis-qos-nslp-01.txt, October 2003

[Non-Patent Document 6] X. Fu, H. Schulzrinne, H. Tschofenig, "Mobility issues in Next Step signaling", draft-fu-nsis-mobility-01.txt, October 2003

[Non-Patent Document 7] Roland Bless, et. Al., "Mobility and Internet Signaling Protocol", draft-manyfolks-signaling-protocol-mobility-00.txt, January 2004

[Non-Patent Document 8] R. Hancock (editor), "Next Steps in Signaling: Framework", draft-ietf-nsis-fw-05.txt, October 2003

[Non-Patent Document 9] Takako SANDA et al.; "A Proposal for Seamless QoS Support in Mobile Networks"; The Institute of Electronics, Information and Communication Engineers, Technical Report of IEICE, Mobile Multi-Media Communication (MoMuC); May 2004.

In FIG. 10, let us imagine a case where MN 10 with QoS guarantee in the subnet 20 before handover performs handover to the subnet 30 and continuously receive after the handover the QoS guarantee which has been received before the handover in the subnet 30, to which it was connected.

In this case, MN 10 cannot receive QoS guarantee during the period from the hand-off from the subnet 20, to which MN 10 has been connected before the handover, up to the time when it is turned to the condition to receive additional services (QoS guarantee in this case) in the subnet 30 where it is connected after the handover. MN 10 cannot receive QoS guarantee at all, or default QoS transfer processing is carried out. This means the breakdown of QoS.

As described above, therefore, QoS guarantee must be quickly provided to MN 10 after the handover. To solve this problem, in the current discussion on NSIS in IETF (e.g. the Non-Patent Document 6), it is proposed that some preparation to establish a new QoS path before MN 10 performs the handover or before the handover is completed, or that a new QoS path must be established in advance. Regarding this point, in the Non-Patent Document 9, for instance, it is suggested to use a method to make preparation for establishing QoS path in advance as a proxy within or near the subnet of the destination transmits and receives a signaling message to and from CN 60. However, when MN 10 is currently in communication with CN 60, which is located at a separated position, the round trip of the signaling message may impede smooth operation of handover.

DISCLOSURE OF THE INVENTION

To solve the above problems, it is an object of the present invention to provide a new path setting method, a mobile terminal, and a path managing device, by which a mobile terminal (mobile node) performing handover can quickly and continuously receive after the handover the additional services, which it has been receiving before the handover.

To attain the above object, the new path setting method according to the present invention is a method in a communication system where a plurality of access routers each constituting a subnet are connected via a communication network, wherein, based on a first path as set between a predetermined correspondent node connected to said communication network and a mobile terminal (mobile node) connected to a first access router, said new path setting method sets up a second path between said predetermined correspondent node connected to the communication network and said mobile terminal under the condition connected to a second access router by performing handover from said first access router to said second access router, wherein:

under the condition that said mobile terminal is connected to said first access router, a message including an information on said first path is transmitted to said second access router or to a predetermined node adjacent thereto from said mobile terminal (mobile node), said method is so arranged that a crossover node of said first path and said second path is determined when the path is changed from said first path to said second path based on overlapping condition of a path from said first access router where said passage passes through said second access router or the predetermined node adjacent to said second access router and said first path.

With the arrangement as described above, a mobile terminal (mobile node) can quickly and continuously receive after the handover the additional services, which it has been receiving before the handover.

Also, the new path setting method according to the present invention is a method in a communication system where a plurality of access routers each constituting a subnet are connected via a communication network, wherein, based on a first path as set between a predetermined correspondent node connected to said communication network and a mobile terminal (mobile node) connected to a first access router, said new path setting method sets up a second path between said predetermined correspondent node connected to the communication network and said mobile terminal under the condition connected to a second access router by performing handover from said first access router to said second access router, wherein said method comprises the steps of:

transmitting a message including information relating to said first path to said second access router or a predetermined node adjacent thereto under the condition that said mobile terminal (mobile node) is connected to said first access router;

adding an information to indicate whether a part or all of network nodes for transferring said message are pass points of said first path, and transferring said message; and recognizing crossover nodes of said first path and said second path when the path is changed from said first path to said second path by referring to an information to indicate whether or not the second access router or a predetermined node adjacent to said second access router receives said message and is a pass point of said first path added to said message by said network node upon receipt of said message.

With the arrangement as described above, a mobile terminal (mobile node) can quickly and continuously receive after the handover the additional services, which it has been receiving before the handover.

Further, the present invention provides the new path setting method as described above, wherein, in addition to the above arrangement, it is so arranged that an information relating to said first path included in said message is an information to identify flow and/or session relating to said first path.

With the arrangement as described above, it is possible, for instance, to perfectly specify a path with QoS guarantee.

Also, the present invention provides the new path setting method as described above, wherein, in addition to the above arrangement, when an information to indicate whether a part or all of said network nodes are pass points of said first path or not is added, said method is so arranged that an information to indicate whether it is a pass point for said first path or not can be identified in case said second access router to ultimately receive said message or a predetermined node adjacent thereto refers to said message.

With the above arrangement, the final receiver of the message can easily specify a network node, which can function as a crossover node, by referring to the received message.

Further, the present invention provides the new path setting method as described above, wherein, in addition to the above arrangement, an interface address of said network node used in said first path is used as an information to indicate whether or not a part or all of said network nodes are pass points of said first path to be added to said message.

With the arrangement as described above, it is possible to easily specify a network node, which can fulfill the function as a crossover node and to acquire an interface address of the network node.

Also, the present invention provides the new path setting method as described above, wherein, in addition to the above arrangement, said method further comprises a step of transmitting a message for resource reservation to said crossover node by said second access router or by a predetermined node adjacent thereto.

With the arrangement as described above, it is possible to perform resource reservation relating to a path up to the node, which has been determined as a crossover node, and to notify that it is a crossover node to the node thus determined.

Further, the present invention provides the new path setting method as described above, wherein, in addition to the above arrangement, said method further comprises a step of initiating operation to release path state in a part of said first path from said crossover node to said mobile node by said crossover node to receive said message for resource reservation.

With the arrangement as described above, a node, which has been determined as the crossover node, can release the setting of a previous path (a path, which the mobile node has been using before the handover) in downstream region (a region closer to the mobile node).

Also, the present invention provides the new path setting method as described above, wherein, in addition to the above arrangement, said method further comprises a step of initiating operation to update path state in overlapping portion of said first path and said second path from said crossover node to said predetermined correspondent node by said crossover node upon receipt of said message for resource reservation.

With the arrangement as described above, the node determined as the crossover node can update a path state of a previous path in upstream region (a region closer to the correspondent node) to a path state for the new path.

Further, the present invention provides the new path setting method as described above, wherein, in addition to the above arrangement, said method further comprises a step of transmitting a message for requesting resource reservation to said crossover node by said second access router or a predetermined node adjacent thereto.

With the arrangement as described above, it is possible to request to a node, which has been determined as a crossover node, to perform resource reservation.

Also, the present invention provides the new path setting method as described above, wherein, in addition to the above arrangement, said method further comprises a step of initiating operation to release path state on a part of said first path from said crossover node to said mobile terminal by said crossover node upon receipt of said message to request resource reservation.

With the arrangement as described above, a node, which has been determined as the crossover node, can release the setting of a previous path (a path, which the mobile node has been using before the handover) in downstream region (a region closer to the mobile node).

Further, the present invention provides the new path setting method as described above, wherein, in addition to the above arrangement, said method further comprises a step of initiating operation to update path state in overlapping portion of said first path and said second path from said crossover node to said predetermined correspondent node by said crossover node upon receipt of said message for resource reservation.

With the arrangement as described above, the node determined as the crossover node can update a path state of a previous path in upstream region (a region closer to the correspondent node) to a path state for the new path.

Also, the present invention provides the new path setting method as described above, wherein, in addition to the above arrangement, said method further comprises a step of initiating operation to reserve resource from said crossover node to said second access router or to a predetermined node adjacent thereto by said crossover node upon receipt of said message for resource reservation.

With the arrangement as described above, the node, which has been determined as a crossover node, can set up a new path (a path, which the mobile node can use after the handover) in downstream region (a region closer to the mobile node).

Further, the present invention provides a mobile terminal in a communication system where a plurality of access routers each constituting a subnet are connected via a communication network, said communication system being so arranged that, based on a first path as set up between a predetermined correspondent node connected to said communication network and a mobile terminal (mobile node) connected to a first access router, a second path is set up between said predetermined correspondent node connected to said communication network and said mobile terminal (mobile node) under the condition connected to said second access router when handover is performed from said first access router to said second access router, wherein said mobile terminal comprises:

address acquiring means for acquiring an address of said second access router or of a predetermined node adjacent thereto; and message transmitting means for transmitting a message, including an information relating to said first path, to said second access router or to a predetermined node adjacent thereto under the condition connected to said first access router.

With the arrangement as described above, a mobile terminal (mobile node) can quickly and continuously receive after the handover the additional services, which it has been receiving before the handover.

The present invention provides a path managing device in a communication system where a plurality of access routers each constituting a subnet are connected via a communication network, wherein, based on a first path as set between a predetermined correspondent node connected to said communication network and a mobile terminal (mobile node) connected to a first access router, said new path setting method sets up a second path between said predetermined correspondent node connected to the communication network and said mobile terminal under the condition connected to a second access router by performing handover from said first access router to said second access router, wherein:

said path managing device being within a network node to transfer a message including an information relating to said first path to be transmitted from said mobile terminal to said second access router or to a predetermined node adjacent thereto under the condition that said mobile terminal is connected to said first access router, wherein said path managing device comprises:

message receiving means for receiving said message;

information adding means for identifying whether or not said network node is a pass point of said first path, and for adding an information to indicate that it is a pass point of said first path when said network node is a pass point of said first path; and message transmitting means for transmitting said message.

With the arrangement as described above, a mobile terminal (mobile node) can quickly and continuously receive after the handover the additional services, which it has been receiving before the handover.

Also, the present invention provides the path managing device as described above, where a plurality of access routers each constituting a subnet are connected via a communication network, wherein, based on a first path as set between a predetermined correspondent node connected to said communication network and a mobile terminal (mobile node) connected to a first access router, said new path setting method sets up a second path between said predetermined correspondent node connected to the communication network and said mobile terminal under the condition connected to a second access router by performing handover from said first access router to said second access router, wherein:

said path managing device being in a network node able to receive a message including an information relating to said first path, an information to indicate whether or not a part or all of said network nodes are pass points of said first path is added to said message from said mobile terminal under the condition connected to said first access router, wherein said path managing device comprises:

message receiving means for receiving said message; and crossover node determining means for determining crossover nodes on said first path and said second path when the path is changed from said first path to said second path by referring to the information to indicate whether or not it is a pass point of said first path added to said message by said network node.

With the arrangement as described above, a mobile terminal (mobile node) can quickly and continuously receive after the handover the additional services, which it has been receiving before the handover.

With the arrangement as described above, the present invention provides the effects that the mobile terminal (mobile node) performing handover can quickly and continuously receive after the handover the additional services, which it has been received before the handover.

BRIEF DESCRIPTION OF THE DRAWINGS

FIG. 13 show an operation to specify a provisional crossover node by sending a message to specify the provisional crossover node to a proxy when MN performs handover in case the transmitting direction of the data is from MN to CN in a communication system in the embodiment of the present invention, and it is a sequence chart to show an example of operation when QUERY and RESERVE messages used in the conventional NSIS are used as the messages; and FIG. 14 is a table to show an example of AP-AR matching information stored in MN in the embodiment of the present invention.

BEST MODE FOR CARRYING OUT THE INVENTION

Figure 1:
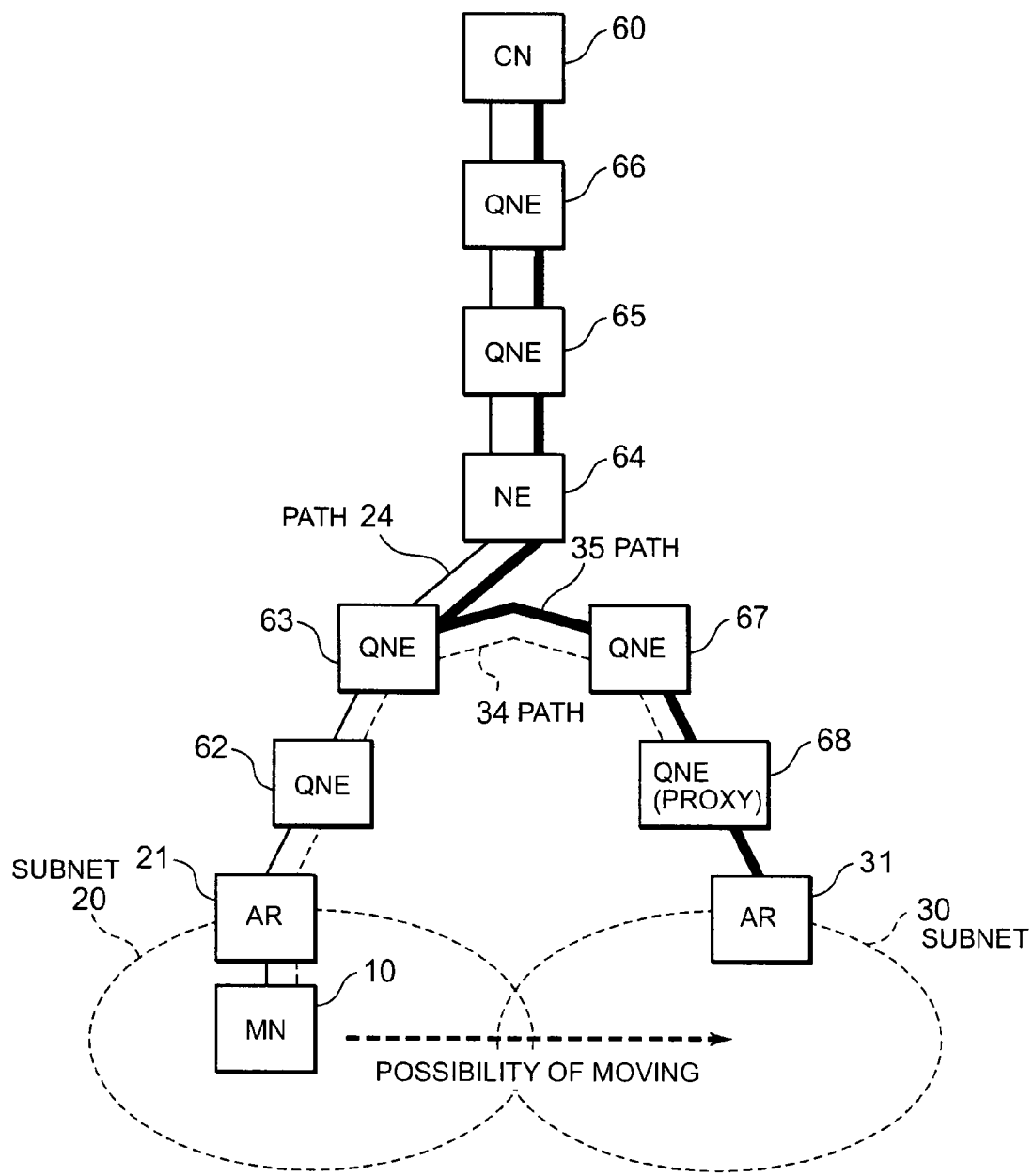
FIG. 1 is a schematical drawing to show an arrangement of a communication system in an embodiment of the present invention.

Description will be given below on am embodiment of the present invention referring to the drawings. FIG. 1 is a schematical drawing to show an arrangement of a communication system in the embodiment of the present invention. In FIG. 1, a QoS path (path 24) established between MN 10 and CN 60 is shown by a solid line when MN 10 is connected to a subnet 20 before the execution of handover. On the path 24, there are AR 21, QNE 62, QNE 63, NE 64, QNE 65, and QNE 66 from MN 10 to CN 60.

As to be described later, after MN 10 makes a decision to perform handover to a subnet 30, MN 10 transmits a message (message A; to be described later) to a proxy (QNE 68). A path, through which this message A passes (path 34), is shown by a dotted line in the figure. On this path 34, there are AR 21, QNE 62, QNE 63, and QNE 67 from MN 10 to QNE (proxy) 68. Also, a new path (path 35) after the moving is shown by a thick solid line in FIG. 1. On this path 35, there are QNE (proxy) 68, QNE 67, QNE 63, NE 64, QNE 65, and QNE 66 from AR 31 to CN 60. In this case, it is supposed that the path is fixed (by route pinning) so that the data to be transmitted and received between MN 10 and CN 60 can accurately pass through a QoS path prepared in advance. It is desirable that the path 35 is extended to a path between MN 10 and CN 60 by an arbitrary method to MN 10 connected to AR 31 after the handover.

According to the present invention, for example, in a condition where MN 10 is connected to the subnet 20 (the condition before the handover of MN 10), the path 24 can be promptly changed to the path 35, which can be used immediately after the decision of MN 10 to perform the handover to the subnet 30.

Figure 2:
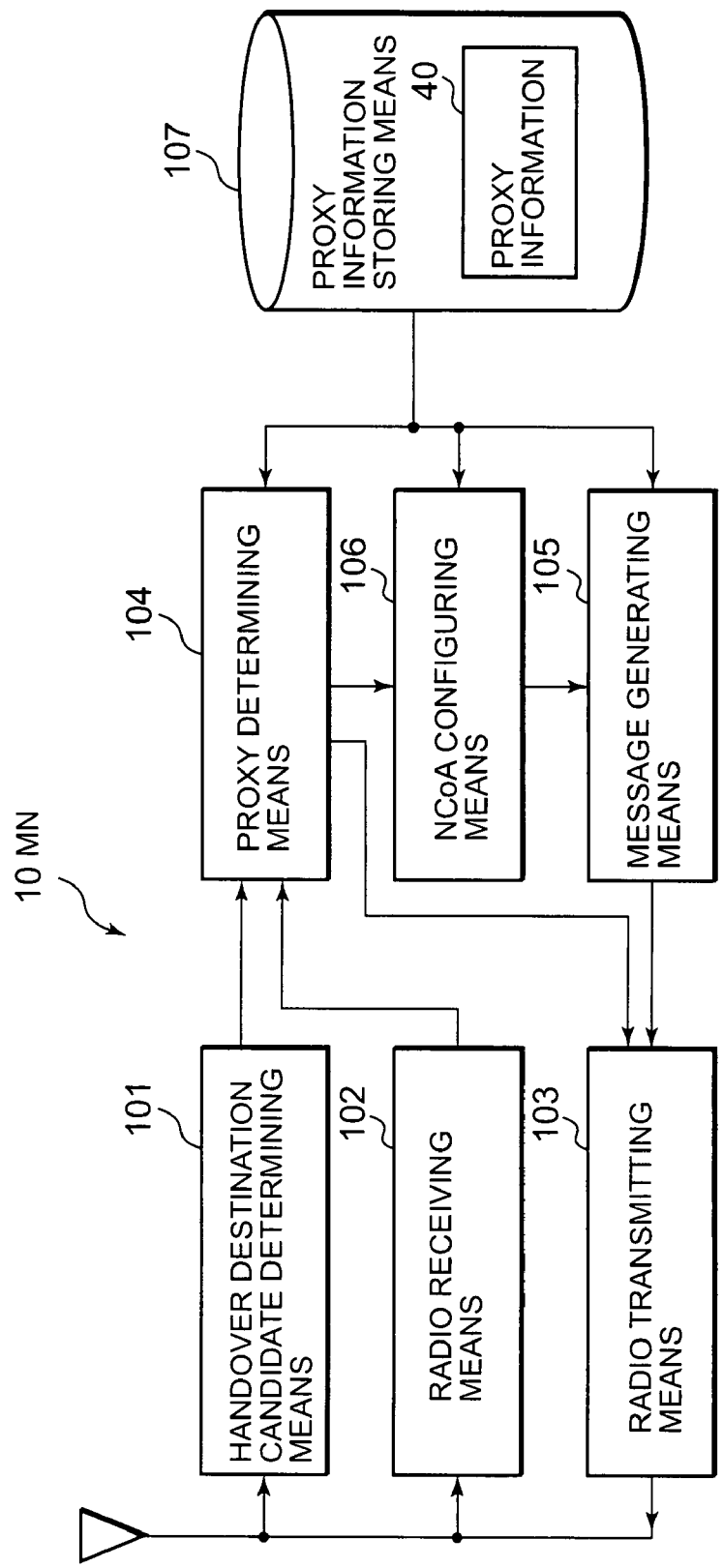
FIG. 2 is a block diagram to show an arrangement of MN (mobile node) in the embodiment of the invention.

Next, description will be given on the function of MN 10. FIG. 2 is a block diagram to show an arrangement of MN in the embodiment of the present invention. In FIG. 2, the functions of MN 10 are shown by blocks, while these functions can be actualized by hardware and/or software. In particular, principal processing of the invention (i.e. the processing of the steps shown in FIG. 12 and FIG. 13) can be executed in accordance with computer programs.

MN 10 as shown in FIG. 2 comprises handover destination candidate determining means 101, radio receiving means 102, radio transmitting means 103, proxy determining means 104, message generating means 105, and NCoA configuring means 106. Also, MN 10 may have proxy information storing means 107.

The handover destination candidate determining means 101 is the means, which can receive signals from a plurality of different APs and search a list of APs, to which L2 handover can be preformed. MN 10 can directly carry out the processing by the proxy determining means 104 as described later without determining L2 handover destination candidate by the handover destination candidate determining means 101. Further, the radio receiving means 102 and the radio transmitting means 103 are the means to perform data receiving and data transmission by radio communication respectively, and various necessary functions to perform radio communication are included in these means.

The proxy determining means 104 is the means to discover a proxy. The proxy to be discovered by the proxy determining means 104 is an NSIS node (QNE) with QoS providing function, which can be prepared in advance, and which can act as a proxy of MN 10 so that MN 10 can receive additional services (here, QoS) after the handover without being interrupted, and it is present on the QoS path, which is scheduled to be prepared when MN 10 performs the handover.

A plurality of methods is conceivable for the discovery of the proxy. These methods include, for instance: a method to refer to a proxy information 40 (a proxy information 40 stored in the proxy information storing means 107) locally stored in MN 10 according to the information of the list of APs acquired by the handover destination candidate determining means 101 and to retrieve and determine the proxy information 40 suitable for the communication with CN 60 on a sub-network, to which AP is connected; a method to transmit the information of the list of APs to a destination such as a server present on the IP network 15 (a proxy retrieval server) and to receive an information relating to the optimal proxy as described above; or a method to select all proxies stored in the proxy information. There may be cases where AR itself of the handover destination candidate is QNE and may be a proxy. Also, the method to discover a utilizable proxy in the present invention is not limited to the above methods, and the other method to discover the other proxy may be used.

Figure 5:
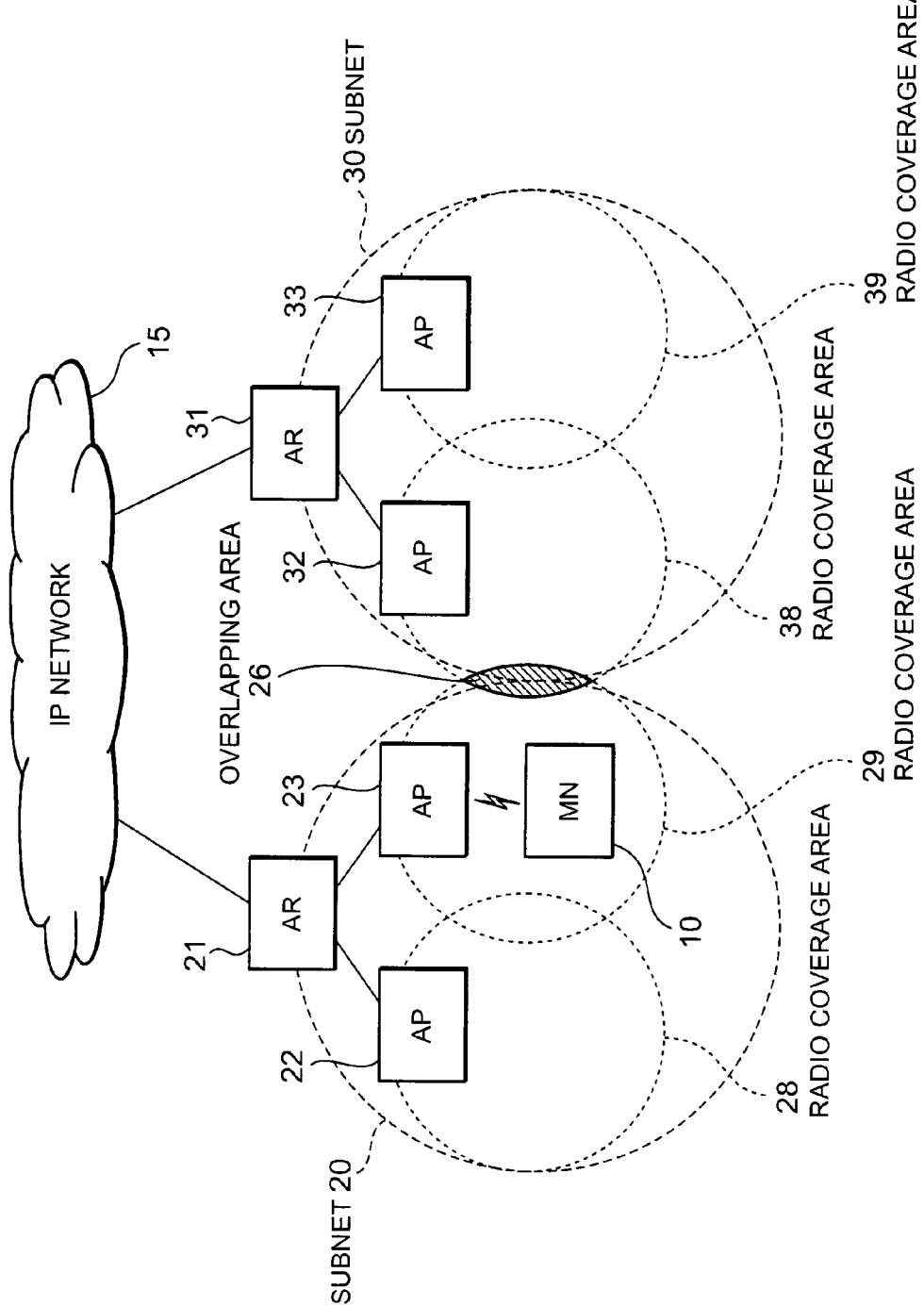
FIG. 5 is a schematical drawing to show an arrangement of a radio communication system common to the present invention and to the prior art.
Figure 6:
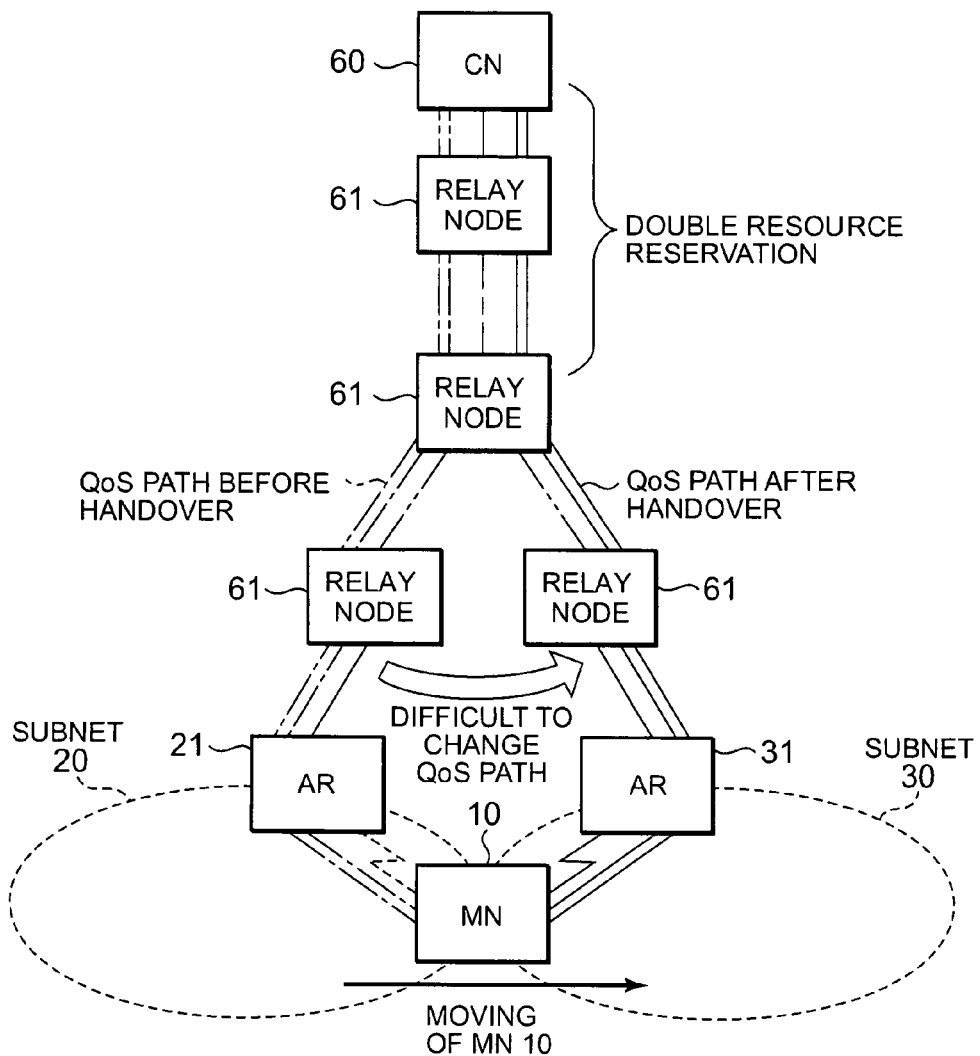
FIG. 6 is a schematical drawing to explain that RSVP in the prior art cannot cope with the moving of MN.
Figure 7:
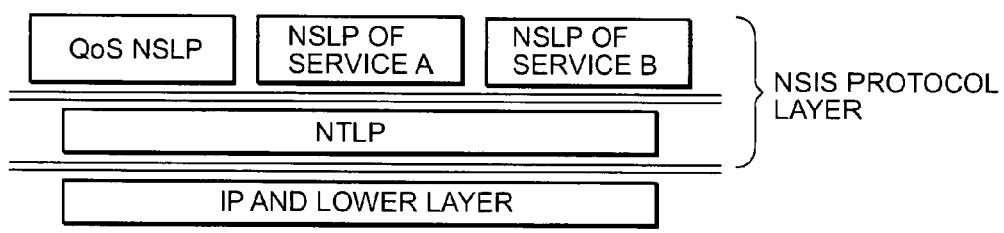
FIG. 7 is a schematical drawing to explain an arrangement of NSIS protocol in the prior art.
Figure 8:
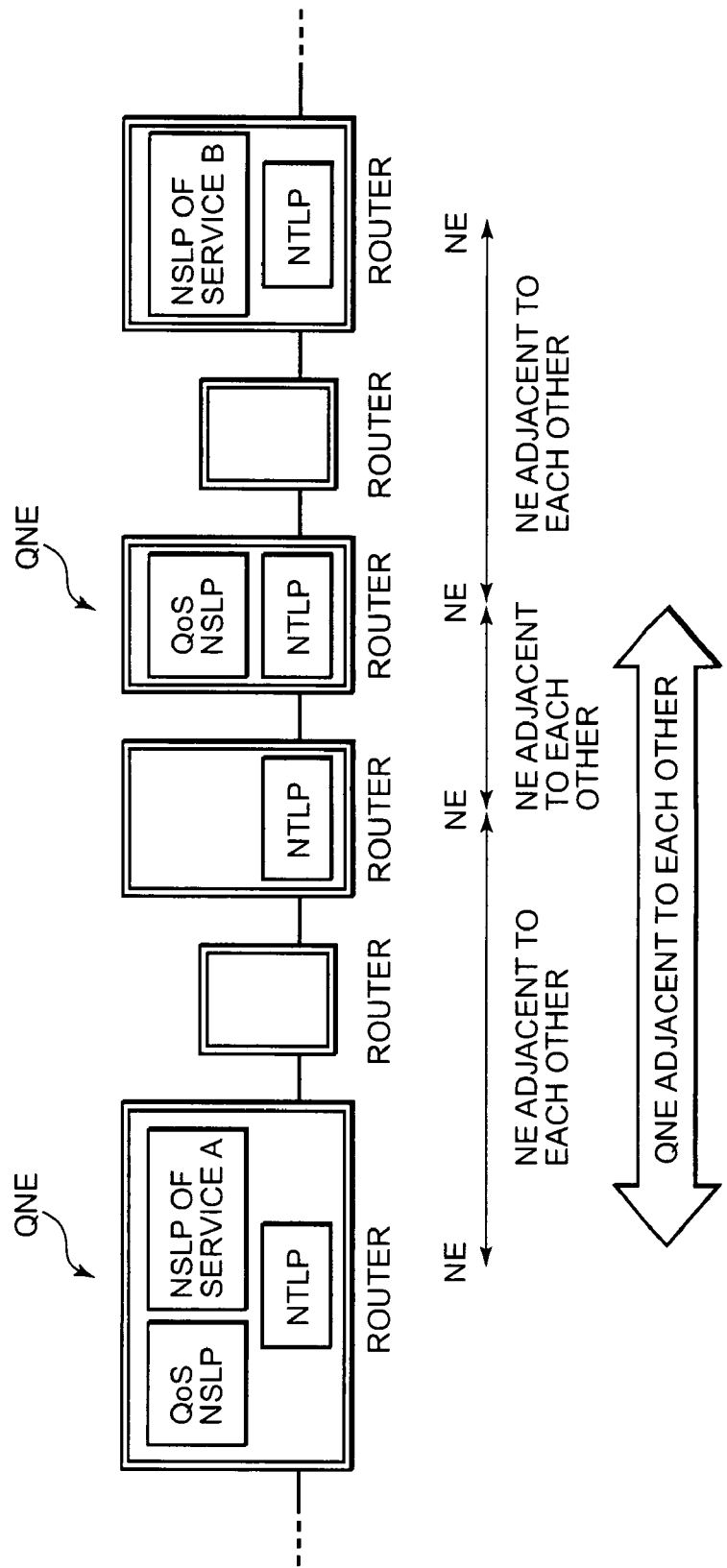
FIG. 8 is a schematical drawing to explain a concept that NE and QNE, i.e. NSIS nodes in the prior art, are "adjacent to each other"
Figure 9:
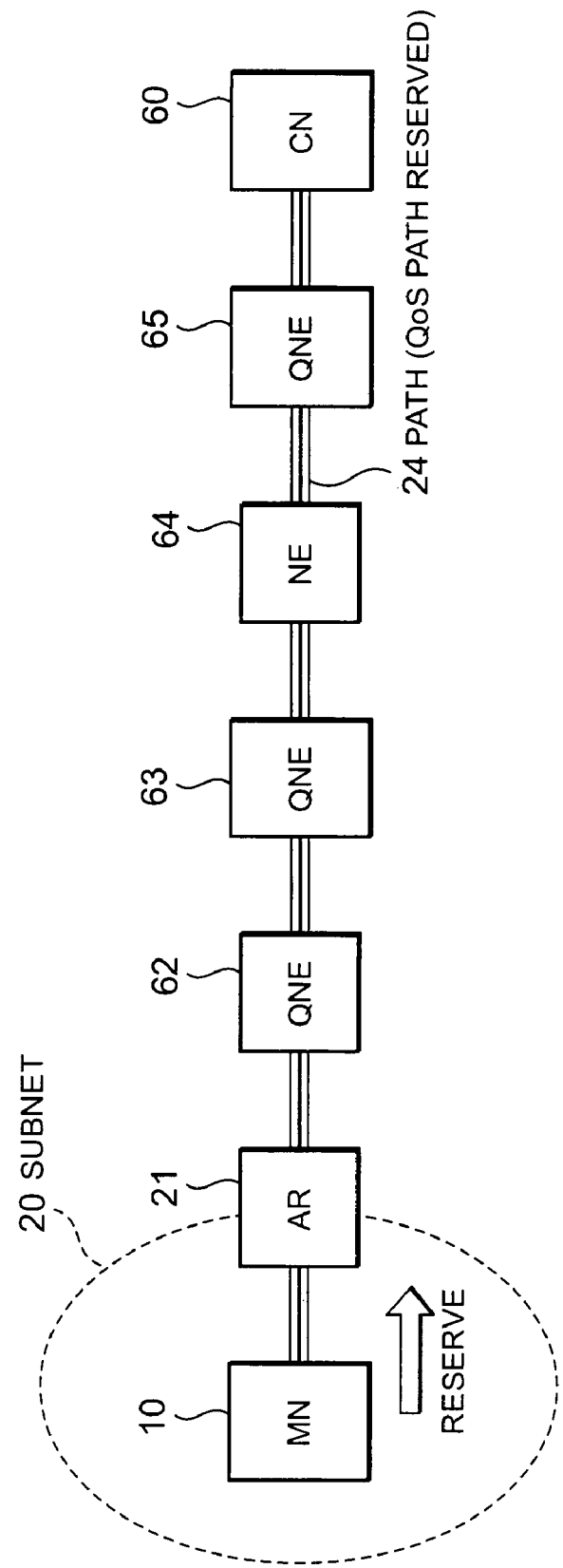
FIG. 9 is a schematical drawing to show how QoS resource reservation is performed in NSIS in the prior art.
Figure 10:
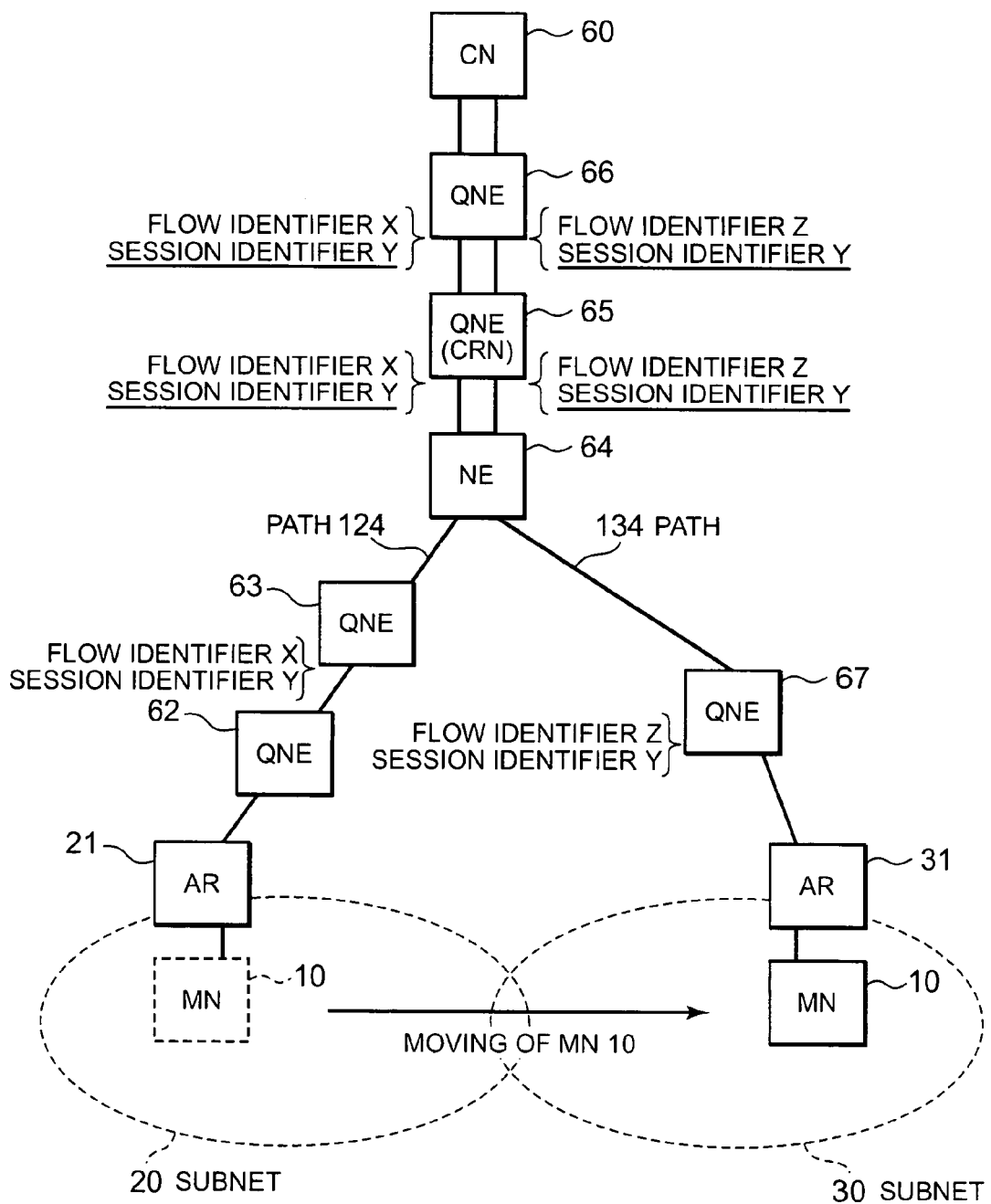
FIG. 10 is a schematical drawing to explain how to avoid double reservation in NSIS in the prior art.
Figure 11:
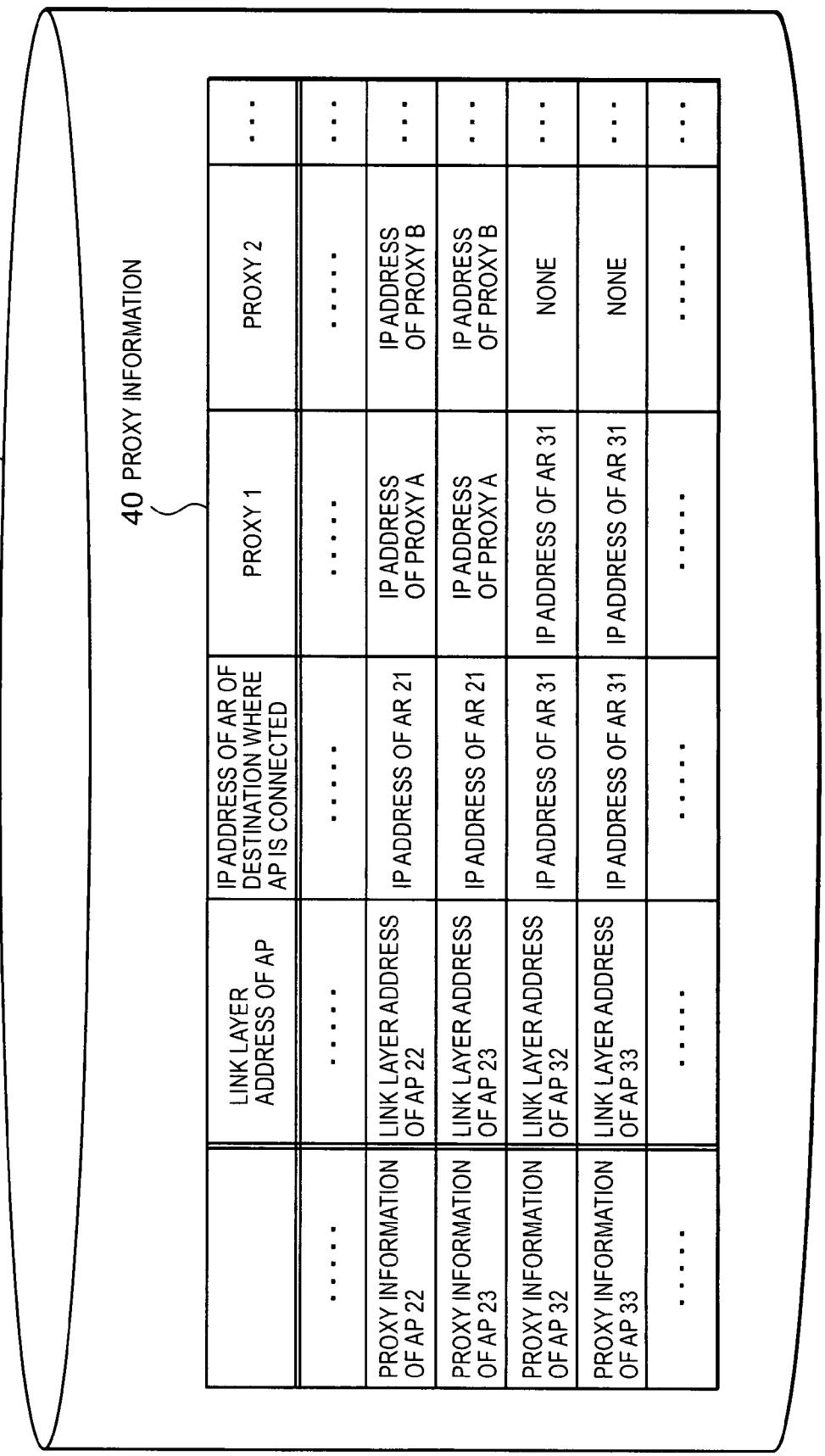
FIG. 11 is a table to show an example of a proxy information stored in MN in the embodiment of the present invention.

FIG. 11 shows an example of contents of the proxy information 40. The proxy information 40 as shown in FIG. 11 is an example prepared by referring to an arrangement of the network in FIG. 5. The proxy information 40 as shown in FIG. 11 has an IP address of a selectable node, which can be selected as the proxy in case MN 10 is connected to each of APs. By referring to the proxy information 40, MN 10 can select and specify the proxy. It is desirable that QNE in the vicinity of AR, which has AP under the control (in the vicinity of AR in the network arrangement) is set as the proxy.

The message generating means 105 is the means to generate the information necessary for the preparation in advance so that MN 10 can receive QoS after the handover without being interrupted at the proxy. The information includes, for instance: an information on a session identifier currently in use, a message including direction of data flow [whether it is a direction from MN 10 to CN 60 (uplink) or it is a direction from CN 60 to MN 10 (downlink)]. Further, it is possible to insert a flow identifier into this message. This message is generated that it is transmitted through a QNE currently being adjacent (QNE 62) in all cases. Here, the above message generated by the message generating means 105 is defined as a message A. Also, as this message A, a QUERY message defined in QoS NSLP of NSIS can be extended and used as described later.

Also, MN 10 can specify a destination of moving and can generate NCoA to be used there and can send it to the proxy of the destination of moving. The means for generating this NCoA is NCoA configuring means 106. The NCoA thus generated may be sent under the condition stored in the message A together with the flow identifier or the like at the message generating means 105. As the NCoA generating method, a method can be conceived, in which MN 10 has locally an AP-AR matching information 41 as shown in FIG. 14 (an example prepared by referring to FIG. 5 in similar manner to FIG. 11), and which retrieves the AP-AR matching information 41 according to the information of AP obtained by the handover destination candidate determining means 101 and which automatically generates NCoA in stateless condition by obtaining the information of AR at the destination where AP is connected (e.g. link layer address of AR, network prefix, prefix length, etc. of the subnet, to which AR belongs).

In this case, however, there must be means, which can confirm whether the NCoA is actually usable at the subnet of the handover destination because NCoA is automatically generated in stateless condition. In such case, it may be so designed that the validity of NCoA can be checked by AR, which has a proxy function by selecting a subnet where AR itself can act as a proxy as the handover destination and by sending the message A including NCoA to this AR. Also, as the method to acquire other NCoA, a method is conceivable, in which AR currently under communication (AR 21 belonging to the subnet 20 before the handover) receives a part of usable CoA in advance from DHCP server of the subnet in the vicinity and one of CoAs received from DHCP server of the subnet is assigned to MN 10 before MN 10 moves to another AR (AR 31, which belongs to the subnet 30 after the handover). In this case, CoA is assigned in stateful condition, and there is no need to check the validity relating to CoA, and there is no restriction in selecting AR with the proxy function as described above. The other types of information can be included in the message A.

Figure 3:
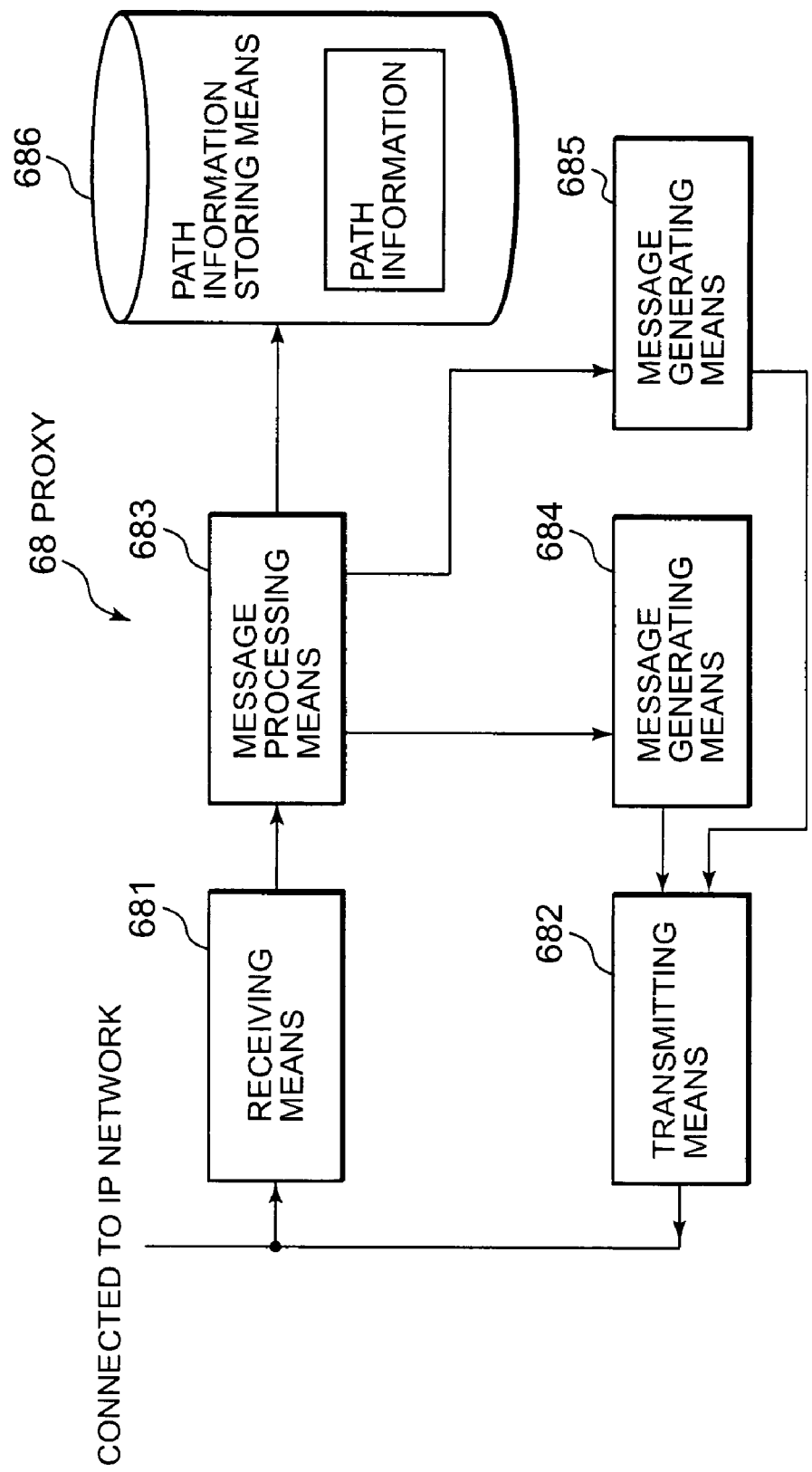
FIG. 3 is a block diagram to show an arrangement of a proxy in the embodiment of the invention.

Next, description will be given on the function of a proxy (QNE 68), which receives the message A from MN 10. Here, let us consider a case where MN 10 selects QNE 68 in FIG. 1 as one of the proxies. FIG. 3 is a block diagram to show an arrangement of the proxy in the embodiment of the present invention. Similarly to the case of MN 10 as shown in FIG. 2, the functions of the proxy 68 shown in FIG. 3 can be fulfilled by hardware and/or software. In particular, principal processing of the present invention (processing of each of the steps shown in FIG. 12 and FIG. 13) can be carried out in accordance with computer programs.

The proxy as shown in FIG. 3 comprises receiving means 681, transmitting means 682, message processing means 683, and message generating means 684 and 685. Also, the proxy 68 may have path information storing means 686.

The receiving means 681 and the transmitting means 682 are the means to perform data receiving and data transmission. The message processing means 683 is the means to receive and to process a message generated at the message generating means 105 of MN 10 shown in FIG. 2 and transmitted by the radio transmitting means 103 (message A). For instance, it confirms the information of flow of the data included in the message A and judges in which way it is desirable to establish the QoS path. Based on the result of this judgment, it is determined to which of the message generating means 684 and the message generating means 685 instructions to generate the message should be given.

To the message A, an information is added by QNE, which has passed through from MN 10 until the arrival at the proxy 68 (e.g. QNE on the path 34). The message processing means 683 can specify QNE where the path 24 and the path 34 are branched off (provisional crossover node) according to an information added to this message A. The provisional crossover node is merely a point where the path 24 and the path 34 are branched off from each other, and it does not concur with a pass point to make the path 35 to be set newly as the optimal path (optimal crossover node). In this connection, the crossover node as searched in the present specification is referred herein as "provisional crossover node", which makes it possible to actualize the quick change of the path in relation to the optimal crossover node, which actualizes optimal path 35. With the QNE thus specified, the proxy 68 can perform the processing to quickly establish QoS path after the handover by MN 10 based on the provisional crossover node (QNE 63 in this case). To perform this processing, several methods can be used: For instance, this information may be delivered to the path information storing means 686, and an arbitrary processing relating to the setting of QoS path may be carried out when MN 10 performs the handover, or when an information of NCoA of MN 10 is acquired in advance (e.g. in case an information of NCoA can be acquired almost at the same time as the receiving of the message A), and the processing of resource reservation may be carried out without delivering the information to the path information storing means 686.

The message generating means 684 generates a message for resource reservation (hereinafter, referred as "message B"). As this message B, a RESERVE message as defined in QoS NSLP of NSIS can be extended and used as described later. After the information of NCoA of MN 10 has been received, the message B for resource reservation is generated at the message generating means 684, and the message B is transmitted to the provisional crossover node (QNE 63) specified according to the information added to the message A. This message B may include the information, which is necessary for receiving QoS service without being interrupted when MN 10 performs the handover (e.g. information of a session identifier, which was used by MN 10 before the handover, information of a flow identifier prepared according to NCoA of MN 10). It may be so designed that an instruction to send a message, which QNE 63 sends to update the path 24 to CN 60 (the message D as described later) and to make it as a part of a new path (path 35), or an instruction to send a message (the message E as described later), by which QNE 63 releases the path of overlapped portion of the path 24 and the path 34, may be included in the message B.

After the proxy 68 receives the information of NCoA of MN 10, the message generating means 685 generates a message to request resource reservation (message C) to QNE 68 from the provisional crossover node (QNE 63). As this message C, a QUERY message as defined in QoA NSLP of NSIS can be extended and used. Similarly to the message B as described above, the information for receiving QoS service without being interrupted during the handover by MN 10, e.g. an information of a session identifier, which MN 10 has been using before the handover, or an information of a flow identifier prepared according to NCoA of MN 10 may be included in the message C.

Also, the following instructions may be included in the message C: an instruction that QNE 63 sends a message to update the path 24 (message D as described later) to CN 60 when the message C arrives at QNE 63, or an instruction that QNE 63 sends a message to release the path of overlapped portion of the path 24 and the path 34 (QNE 63-QNE 62-AR 21).

As described above, QNE 68, which has the function as a proxy, is designed to perform the processing to generate the message B (message to perform resource reservation) by the message generating means 684 in response to the content of the message A, or to perform the processing to generate the message by the message generating means 685 (message to request resource reservation).

Figure 4:
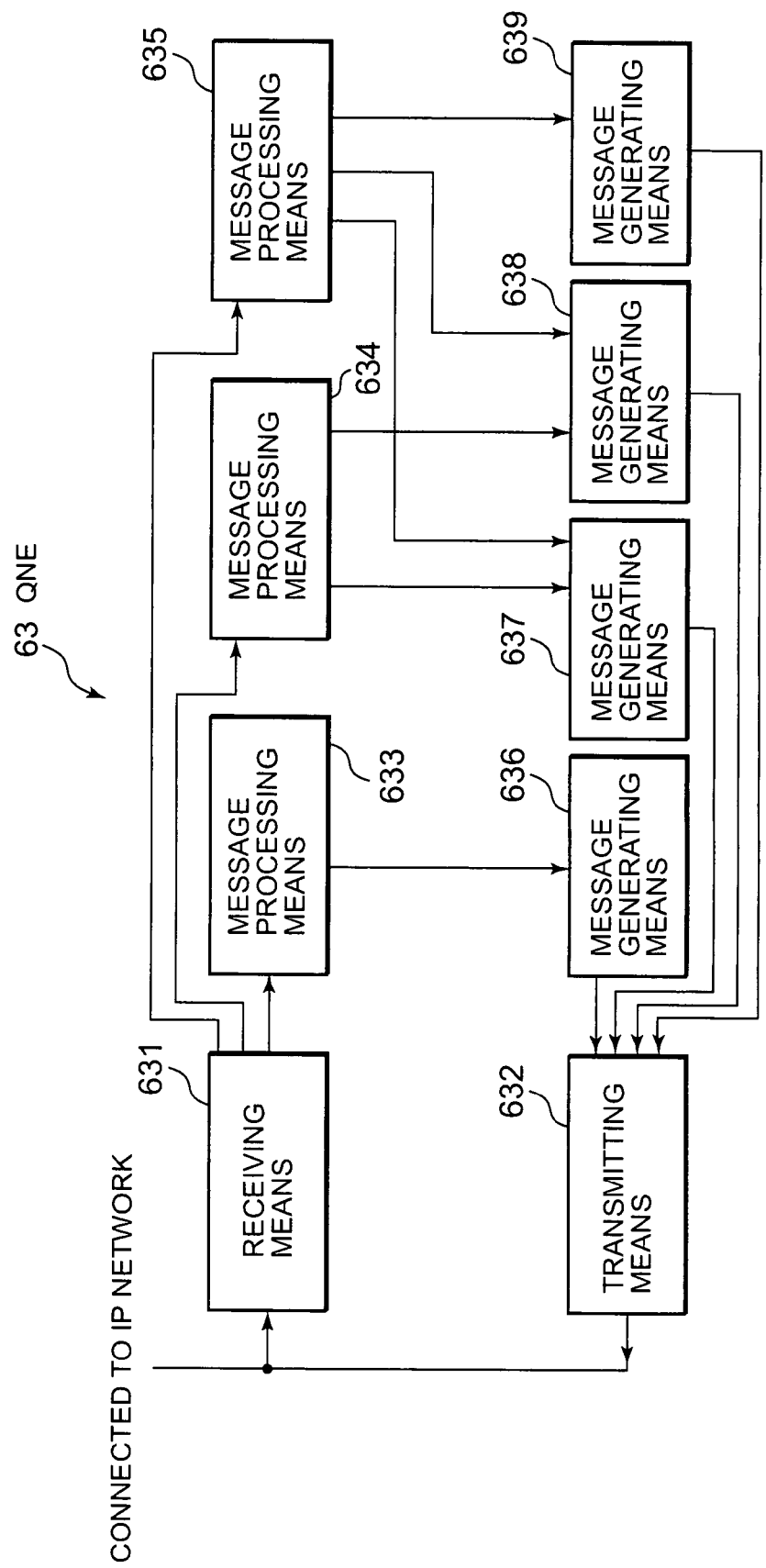
FIG. 4 is a block diagram to show an arrangement of QNE in the embodiment of the invention.

Next, description will be given on the function of QNE at intermediate portion of the path 34 by taking an example on QNE 63. FIG. 4 is a block diagram to show an arrangement of QNE on the path 34 in the embodiment of the present invention. Similarly to MN 10 as shown in FIG. 2, the functions of QNE 63 as shown in FIG. 4 can be achieved by hardware and/or software. In particular, principal processing of the present invention (processing in each of the steps in FIG. 12 and FIG. 13 as given later) can be executed according to computer program.

QNE 63 as shown FIG. 4 comprises receiving means 631, transmitting means 632, message processing means 633, 634 and 635, and message generating means 636, 637, 638 and 639. The receiving means 631 and the transmitting means 632 have the same functions as those of the receiving means 681 and the transmitting means 682 of the proxy 68 shown in FIG. 3.

The message processing means 633 is the means to check whether resource reservation is present in QNE 63 or not in relation to the session identifier contained in the message A when the message A is received. In case there is no resource reservation relating to the session identifier included in the message A, no processing is performed at the message processing means 633, and the message A is transferred to the next QNE via the transmitting means 632. On the other hand, if there is resource reservation, IP address of the interface is stored in the received message A at the message generating means 636, and a new message A generated at the message generating means 636 (message A where IP address of interface is stored) is transmitted to the next QNE (QNE 67 in case of QNE 63) via the transmitting means 632. When the IP address of the interface is added to the message A at QNE of the preceding stage, an IP address of own interface may be newly added by overwriting it on the IP address of QNE of the preceding stage, or by clearly defining the adding order, the IP address of own interface may be added while leaving the IP address of interface of QNE in the preceding stage.

When the message B as described above has been received, the message processing means 634 judges as to whether to send a message to update the path 24 (message D) to CN 60 or to send a message to release the path of overlapped portion of the path 24 and the path 34 (QNE 63-QNE 62-AR 21) (message E). This judgment may include the decision as to at which time the message is to be sent. This judgment may be made according to the instruction included in the message B or may be made within the message processing means 634. The message D is generated at the message generating means 637, and the message E is generated at the message generating means 638. As the message D or the message E, a RESERVE message defined at QoS NSLP may be extended and used as described later.

When the message C as described above is received, the message processing means 635 delivers the information included in the message C to the message generating means 639. The message generating means 639 can generate the message B as described above (the message to perform resource reservation), and this message B is transmitted to QNE 68 via the transmitting means 632. The generated message B may be sent to MN 10 after moving, depending on the content of the instruction included in the message C.

Further, the message processing means 635 can judge as to whether to send the message (message D) to update the path 24 to CN 60 or to send a message to release the path of overlapped portion of the path 24 and the path 34 (QNE 63-QNE 62-AR 21). This judgment may include the decision as to at which time this message is to be transmitted. This judgment may be made according to the instruction included in the message B or may be made within the message processing means 635. The message D is generated at the message generating means 637, and the message E is generated at the message generating means 638.

Figure 12:
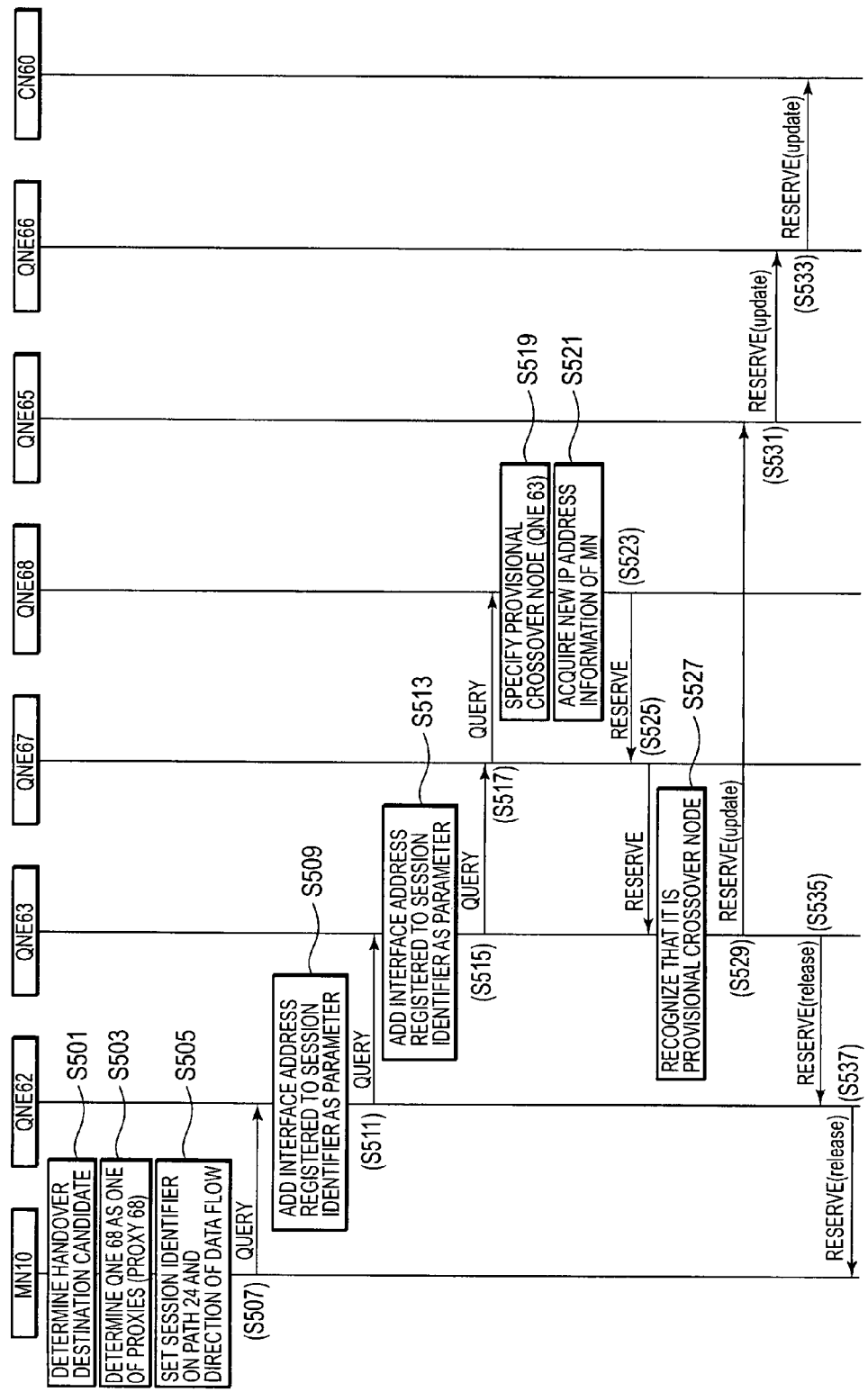
FIG. 12 shows an operation when a provisional crossover node is specified by sending a message to specify the provisional crossover node to a proxy when MN performs handover in case the transmitting direction of the data is from CN to MN in a communication system in the embodiment of the present invention and to transmit and receive the data on the path by preparing a QoS path to pass through the specified crossover node, and it is a sequence chart to show an example of operation when QUERY and RESERVE messages used in the conventional NSIS are used as the messages.

Next, description will be given on the operation, by which QNE 68 can specify a provisional crossover node by sending the message A to specify the provisional node from MN 10 to QNE 68 when MN 10 performs the handover and QoS path via the provisional crossover node is prepared. FIG. 12 shows a sequence chart in the present embodiment, according to which MN 10 sends information of an identifier (session identifier) to the proxy 68, and the proxy 68 specifies a provisional crossover node (QNE 63), and a new QoS path for downlink is established via the provisional crossover node. Also, FIG. 13 shows a sequence chart, according to which MN 10 sends the information of an identifier (session identifier) to the proxy 68, and the proxy 68 specifies a provisional crossover node (QNE 63), and a new QoS path for uplink is established via the provisional crossover node. The sequence charts as shown in FIG. 12 and FIG. 13 are the charts when the proxy 68 is selected as a proxy by MN 10 in the network system shown in FIG. 1.

Here, description will be given on the case where a QUERY message or a RESERVE message is used, which are the messages defined at QoS NSLP of NSIS respectively as concrete examples of the message A, the message B, the message C, the message D and the message E as described above. The message A corresponds to QUERY message, the message B corresponds to RESERVE message (for resource reservation), the message C corresponds to QUERY message, the message D corresponds to RESERVE message (to update the path state), and the message E corresponds to RESERVE message (to release the path state).

First, description will be given on the operation to establish a new QoS path in downlink direction by referring to FIG. 12. Upon receipt of the L2 information from AP as reachable by L2 signal in the vicinity, MN 10 decides a network where handover can be performed according to the information (Step S501: decision of handover destination candidate). Then, based on the L2 information of AP, the proxy at the handover destination candidate is determined (Step S503: determines QNE 68 as a proxy (proxy 68)). When the proxy is determined, MN 10 sets up a session identifier for downlink on the path 24 to QUERY message. Also, the information as being downlink is set to QUERY message (Step S505: session identifier on the path 24 and flowing direction of the data are set), and the QUERY message is transmitted to the selected proxy (here, QNE 68) (Step S507).

QNE 62, which is a QNE belonging to the path 34, receives the QUERY message sent in Step S507 for once and checks whether the resource reservation to the session identifier as set in Step S505 is currently present in QUE 62 or not. In case the resource reservation to this session identifier is present, QNE 62 adds the address of interface where this reservation is present to the QUERY message (Step S509: to add the registered interface address to the session identifier as parameter). Further, normal QUERY processing is performed, and this QUERY message is transmitted to the transmission destination (QNE 68) (Step S511). Here, in the network arrangement (See FIG. 1) taken as the premise, it is assumed that the resource reservation to the session identifier is present within QNE 62. If the resource reservation to the session identifier is not present in QNE 62, QNE 62 performs only the normal QUERY processing, and this QUERY message is transmitted to the transmission destination (QNE 68).

QNE 63, which is the next QNE belonging to the path 34, receives the QUERY message sent in Step S511 similarly for once and checks whether reservation of resource to the session identifier as set in the QUERY message in Step S505 is currently present in QNE 63 or not. If resource reservation to the session identifier is present, QNE 63 adds the address of interface where this reservation is present to the QUERY message (Step S513: The interface address with registration to the session identifier is added as parameter). Further, normal QUERY processing is performed, and this QUERY message is transmitted to the transmission destination (QNE 68) (Step S515). Similarly to the case of QNE 62 as given above, in the network arrangement (See FIG. 1) taken as the premise, it is assumed that the resource reservation to the session identifier is present in QNE 63. If the resource reservation to the session identifier is not present in QNE 63, QNE 63 performs only the normal QUERY processing, and this QUERY message is transmitted to the transmission destination (QNE 68).

QNE 67, which is the next QNE belonging to the path 34, receives the QUERY message sent in Step S515 similarly for once and checks whether the resource reservation to the session identifier as set in the QUERY message in Step S505 is currently present in QNE 67 or not. In the network arrangement (See FIG. 1) taken as the premise, if the resource reservation to this session identifier is not present in QNE 67, QNE 67 performs only the normal QUERY processing, and this QUERY message is transmitted to the transmission destination (QNE 68) (Step S517). If the resource reservation to the session identifier is present in QNE 67, QNE 67 performs, together with the normal QUERY processing, the processing to add the interface address where the reservation is present to this QUERY message.

From the information in the QUERY message received from MN 10 via QNE 62, QNE 63 and QNE 67 on the path 34, QNE (proxy) 68 specifies a provisional crossover node (Step S519: specifying of the provisional crossover node (QNE 63)). For instance, QNE 68 refers to the interface addresses of QNE 62 and QNE 63 added in the QUERY message and can identify that the QNE (here, QNE 63), to which the interface address has been most newly (i.e. at the last moment) added, is the QNE where the path 24 and the path 34 are branched off from each other—that is, it can be the provisional crossover node. When a routing table or the like is referred in order to perform transfer processing relating to this QUERY message, it may be identified in some cases that the path 24 and the path 34 are directed to different links. Or, by referring to the state of QNEs adjacent to each other, it may be identified in some cases that the adjacent QNE, which is the next to receive QUERY message, has been changed from QNE 65 to QNE 67. In such case, QNE itself can identify that it is the QNE where the path 24 and the path 34 are branched off from each other at that moment.

Further, when QNE 68 acquires information of NCoA of MN 10 (Step S521: Acquisition of new IP address information of MN), QNE 68 generates a RESERVE message (RESERVE message for resource reservation; described as RESERVE in FIG. 12) to perform new resource reservation on the path 35 from QNE 68 to QNE 63 (the same path as the path 34 between QNE 63 and QNE 68), and transmits the message to QNE 63. The information of NCoA of MN 10, which QNE 68 acquires in Step S521, may be included in the QUERY message received by QNE 68 in some cases, or MN 10 moves to the network under the control of AR 31 and the information may be notified to QNE 68 when NCoA is acquired.

QNE 67, which is a QNE belonging to the path 35, receives the RESERVE message sent in Step S523 for once. After normal RESERVE processing, this RESERVE message is transmitted to the transmission destination (QNE 63) (Step S525).

When QNE 63 receives the RESERVE message sent from QNE 68, QNE 63 refers that its own address (QNE 63) is set up to the end point address of the RESERVE message, and recognizes that QNE 63 is a provisional crossover node (Step S527: recognizes that it is a provisional crossover node), and transmits the RESERVE message to instruct the updating to change the state information of the path 24 to state information of the path 35 (RESERVE message for updating of path state) to CN 60 (Step S529). It is desirable that a part of the path 24 (the path between QNE 63 and CN 60) is identical to a part of the path 35 (the path between QNE 63 and CN 60). It may be so arranged that an information that QNE 63 is a provisional crossover node is explicitly contained in the RESERVE message sent from QNE 68, and that QNE 68 can recognize that it is itself a crossover node. Further, in this RESERVE message, it can be so arranged that an instruction as to which kind of processing the provisional crossover node performs subsequently is included in this RESERVE message (e.g. processing to apply RESERVE to perform updating along the path 24 in the direction toward CN 60).

QNE 65, which is a QNE belonging to the path 24, receives the RESERVE message sent from QNE 63 for once and performs normal RESERVE (update) processing and transmits this RESERVE message to the transmission destination (CN 60) (Step S531).

QNE 66, which is a QNE belonging to the path 24, receives the RESERVE message sent from QNE 63 for once similarly to QNE 65. After performing normal RESERVE processing, this RESERVE message is transmitted to the transmission destination (CN 60) (Step S533). When this RESERVE message reaches CN 60, the state information relating to the path 24 between QNE 63 and CN 60 is updated to the state information of the path 35 between QNE 63 and CN 60, and resource reservation to the path 35 is completed. It is desirable that the data to be sent from CN 60 to MN 10 thereafter is transmitted after route pinning so that the data can pass accurately through the path 35.

Also, at the same time as the transmission of the RESERVE message in Step S527 or some time later, QNE 63 can transmit (Step S535) the RESERVE message for releasing the path state (in FIG. 12, described as RESERVE (release)) to release the state to a previous path (overlapped portion of the path 24 and the path 34). As a result, resource reservation, which has become unnecessary as the result of the moving of MN 10, can be quickly released.

In this case, QNE 62, which is a QNE belonging to the overlapped portion of the path 24 and the path 34, receives the RESERVE message sent from QNE 63 for once. After performing normal RESERVE (release) processing, this RESERVE message is transmitted to transmission destination (previous CoA of MN 10) (Step S537). However, in case QNE 62 already knows that MN 10 has moved, QNE 62 may perform only the processing to release the state and may not transmit the RESERVE message (Step S537).

Next, referring to FIG. 13, description will be given on operation to establish a new QoS path in uplink direction. In the description given below, the same QNE and the same path as in the case of downlink described above are used. Even when the path is different from that of downlink, the same conclusion can be reached by the same means.

The processing from Step S551 to Step S571 is the same as the processing from Step S501 to Step S521 in FIG. 12. Specifically, upon receipt of the L2 information from AP, which can reach L2 signal in the vicinity, MN 10 determines the network where the handover can be performed (Step S551: determines handover destination candidate). Then, based on the L2 information of AP, a proxy of the handover candidate is determined (Step S553: QNE 68 is determined as one of the proxies (proxy 68)). After determining the proxy, MN 10 sets the session identifier for uplink in the path 24 to the QUERY message. Also, an information that it is uplink is also set to the QUERY message (Step S555: session identifier on the path 24 and direction of the data flow are set). Then, the QUERY message is transmitted to the selected proxy (here, QNE 68) (Step S557).

QNE 62, which is a QNE belonging to the path 34, receives the QUERY message sent in Step S557 for once and checks whether the resource reservation to the session identifier as set in the QUERY message in Step S555 is currently present in QNE 62 or not. In case the resource reservation to the session identifier is present, the interface address where the reservation is present is added to this QUERY message (Step S559: Interface address with registration to the session identifier is added as parameter). Further, normal QUERY processing is performed, and this QUERY message is transmitted to the transmission destination (QNE 68) (Step S561). In the network arrangement taken as the premise (See FIG. 1), it is assumed that the resource reservation to the session identifier is present in QNE 62. If the resource reservation to the session identifier is not in QNE 62, QNE 62 performs only the normal QUERY processing, and this QUERY message is transmitted to the transmission destination (QNE 68).

QNE, which is the next QNE belonging to the path 34, receives the QUERY message sent in Step S561 similarly for once and checks whether the resource reservation to the session identifier as set in the QUERY message in Step 555 is currently present in QNE 63 or not. In case the resource reservation to the session identifier is present, the interface address where the reservation is present is added to this QUERY message (Step S563: The interface address with registration to the session identifier is added as parameter). Further, normal QUERY processing is performed, and this QUERY message is transmitted to the transmission destination (QNE 68) (Step S565). Similarly to the case of QNE 62 as described above, in the network arrangement taken as the premise (See FIG. 1), it is assumed that the resource reservation to the session identifier is present in QNE 63. If the resource reservation to this session identifier is not present in QNE 63, QNE 63 performs only the normal QUERY processing, and this QUERY message is transmitted to the transmission destination (QNE 68).

QNE 67, which is the next QNE belonging to the path 34, receives the QUERY message sent in Step S565 similarly for once and checks whether the resource reservation to the session identifier as set in the QUERY message in Step S555 is currently present in QNE 67 or not. In the network arrangement taken as the premise (See FIG. 1), the resource reservation to the session identifier is not present in QNE 67. Thus, only the normal QUERY processing is performed, and this QUERY message is transmitted to the transmission destination (QNE 68) (Step S567). If the resource reservation to this session identifier is present in QNE 67, QNE 67 performs, together with normal QUERY processing, the processing to add the interface address where the reservation is present to this QUERY message.

At QNE (proxy) 68, similarly to the case where a new QoS path in downlink direction is established, a provisional crossover node is specified from the information in the QUERY message received from MN 10 via QNE 62, QNE 63, and QNE 67 on the path 34 (Step S569: specifying of a provisional crossover node (QNE63)). Then, after acquiring the information of NCoA of MN 10 (Step S571: acquisition of new IP address information of MN), QNE 68 generates a QUERY message in order to request the transmission of the RESERVE message (RESERVE message for resource reservation: described as RESERVE (update) in FIG. 13) for a new resource reservation on the path 35 from QNE 63 to QNE 68 (the same path as the path 34 between QNE 63 and QNE 68 and transmits it to QNE 63 (Step S573). In Step S571, the information of NCoA of MN 10 to be acquired by QNE 68 may be included in the QUERY message received by QNE 68 in some cases. Or, the message may be notified to QNE 68 when MN 10 moves to the network under the control of AR 31 and acquires NCoA.

QNE 67, which is a QNE belonging to the path 35, receives the QUERY message sent in Step S573 for once. After performing normal QUERY processing, this QUERY message is transmitted to the transmission destination (QNE 63) (Step S575).

Upon receipt of the QUERY message sent from QNE 68, QNE 63 recognizes that QNE 63 itself is a provisional crossover node (Step S577: recognizes that it is a provisional crossover node) and transmits a RESERVE message to instruct the updating to change the state information of the path 24 to the state information of the path 35 to CN 60 (RESERVE message for updating of path state) (Step S579). It is desirable that a part of the path 24 (the path between QNE 63 and CN 60) is identical to a part of the path 35 (the path between QNE 63 and CN 60).

QNE 65, which is a QNE belonging to the path 24, receives the RESERVE message sent from QNE 63 for once. After performing normal RESERVE (update) processing, this RESERVE message is transmitted to the transmission destination (CN 60) (Step S581).

QNE 66, which is a QNE belonging to the path 24, receives the RESERVE message sent from QNE 63 for once. After performing normal RESERVE (update) processing, this RESERVE message is transmitted to the transmission destination (CN 60) (Step S583). When this RESERVE message reaches CN 60, the state information relating to the path 24 between QNE 63 and CN 60 is updated to the state information relating to the path 35 between QNE 63 and CN 60, and the resource reservation to the path 35 is completed. It is desirable that the data to be sent from CN 60 to MN 10 thereafter is transmitted after route pinning so that the data can accurately pass through the path 35.

At the same time as the transmission of the RESERVE message in Step S579, QNE 63 generates a RESERVE message for reservation of QoS resource on the path 34 toward QNE 68, and this RESERVE message (described as RESERVE (update) in FIG. 13) can be transmitted to QNE 68 (Step S585). It may be transmitted to MN 10 in case MN 10 has already moved to a region under the control of AR 31.

In this case, QNE 67, which is a QNE belonging to the path 35, receives the RESERVE message sent in Step S585 for once. After performing normal RESERVE processing, this RESERVE message is transmitted to the transmission destination (QNE 68) (Step S587). When this RESERVE message reaches QNE 68, the resource reservation to the path 35 is completed. The data to be sent from MN 10 to CN 60 thereafter is transmitted after route pinning so that it can accurately pass through the path 35.

At the same time as the transmission of the RESERVE message in Step S579 or in Step S585 or some time later, QNE 63 may transmit the RESERVE message (described as RESERVE (release) in FIG. 13) to the previous CoA of MN 10 to release the state to the previous path (overlapped portion of the path 24 and the path 34) (Step S589). As a result, it is possible to quickly release the resource reservation, which has become unnecessary due to the moving of MN 10.

In this case, QNE 62, which is a QNE belonging to the overlapped portion of the path 24 and the path 34, receives the RESERVE message sent from QNE 63 for once. After performing normal RESERVE (update) processing, this RESERVE message is transmitted to the transmission destination (previous CoA of MN 10) (Step S591). In case QNE 62 already knows that MN 10 has moved, only the processing of the release of state is performed and the transmission of the RESERVE message (Step S591) may not be performed.

As described above, when MN 10 performs the handover, a provisional crossover node is specified when MN 10 transmits the message to a predetermined proxy, and QoS path is prepared to pass through this provisional crossover node, and the data may be transmitted or received along this path. In so doing, it is possible to avoid useless round trip of the signaling message, and QoS path can be quickly prepared. Also, when there are a plurality of flows bundled together in the session identifier, QoS path can be quickly established at one time to the plurality of flows.

In the embodiment as described above, description has been given on a case where there is one QoS path between MN 10 and CN 60 before MN 10 performs the handover. However, there are the cases where two or more QoS paths are set between MN 10 and CN 60 or the case where QoS paths are set between MN 10 and each of a plurality of CN 60.

As described above, MN 10 has a plurality of QoS paths. When there are two or more adjacent QNEs (e.g. QNE 62 in FIG. 1) of MN 10, it is desirable that MN 10 controls so that an information necessary for preparation to set QoS path after the handover is transmitted to match QoS path passing through each of the adjacent QNEs via each adjacent QNE, i.e. information included in the message A as given above. As a result, when there are two or more adjacent QNEs, the message A including the information to match QoS path to pass through each of the adjacent QNEs is transmitted from MN 10 to each of the adjacent QNEs, and it is possible to perform the operation for setting the switchover of the path as described above.

The expression of "transmission destination" as described in this specification (e.g. the expression to transmit to CN 60) is used not necessarily in the meaning that the address of CN 60 is designated and transmitted to the transmission destination address of IP header. It means that the ultimate partner to receive the message is CN 60.

Each functional block used in the description of the embodiment of the present invention as given above is typically actualized as LSI (Large Scale Integration), which is an integrated circuit. These may be produced in a single chip individually or may be produced as one chip to contain a part or all. Here, it is called LSI, while it may be called IC (Integrate Circuit), system LSI, super LSI, or ultra LSI, depending on the difference in the degree of integration.

The technique of integration is not limited to LSI, and it may be actualized as a special-purpose circuit or a general-purpose processor. After the manufacture of LSI, FPGA (Field Programmable Gate Array), which can be programmed, or a reconfigurable processor, in which connection or setting of circuit cells inside LSI can be reconfigured, may be used.

Further, with the emergence of new technique of integration, which may replace LSI, and with the progress of semiconductor technique or other types of technique derived from it, the functional block may be integrated by using such techniques. For example, the adaptation of biotechnology may be one of such possibilities.

INDUSTRIAL APPLICABILITY

The new path setting method, the mobile terminal and the path managing device according to the present invention provide the effects to achieve the possibility that the mobile terminal performing the handover can quickly and continuously receive after the handover the additional services, which it has been receiving before the handover. It can be applied to technical field for the setting of new path in case of the handover of the mobile terminal during radio communication. In particular, it can be applied to the technical field for the setting of a new path or the technical field to guarantee QoS using NSIS for the handover by the mobile terminal during radio communication using mobile IPv6 protocol, which is the next generation Internet protocol.

The invention claimed is:

1. A new path setting method in a communication system where a plurality of access routers each constituting a subnet are connected via a communication network, wherein, based on a first path as set between a predetermined correspondent node connected to said communication network and a mobile terminal connected to a first access router, said new path setting method sets up a second path between said predetermined correspondent node connected to the communication network and said mobile terminal under a condition where the mobile terminal is connected to a second access router by performing a handover from said first access router to said second access router, wherein said method comprises the steps of:

under a condition that said mobile terminal is connected to said first access router, a message including information on said first path is transmitted to said second access router or to a predetermined node adjacent thereto from said mobile terminal, and a crossover node of said first path and said second path is determined when the path is changed from said first path to said second path based on an overlapping condition of a path from said first access router where said message passes through said second access router or the predetermined node adjacent to said second access router and said first path.

2. A new path setting method in a communication system where a plurality of access routers each constituting a subnet are connected via a communication network, wherein, based on a first path as set between a predetermined correspondent node connected to said communication network and a mobile terminal connected to a first access router, said new path setting method sets up a second path between said predetermined correspondent node connected to the communication network and said mobile terminal under a condition where the mobile terminal is connected to a second access router by performing a handover from said first access router to said second access router, wherein said method comprises the steps of:

transmitting a message including information relating to said first path to said second access router or a predetermined node adjacent thereto under a condition that said mobile terminal is connected to said first access router;

adding by a part or all of network nodes for transferring said message information to indicate whether or not the part or all of the network nodes for transferring said message are pass points of said first path to said message, and transferring said message to said second access router or said predetermined node adjacent thereto;

receiving, by said second access router or said predetermined node adjacent thereto, said message; and recognizing, by said second access router or said predetermined node adjacent thereto, a crossover node of said first path and said second path when the path is changed from said first path to said second path by referring to said information to indicate whether or not the part or all of the network nodes for transferring said message are the pass points of said first path.

3. The new path setting method according to claim 2, wherein said information relating to said first path included in said message is information to identify a flow and/or a session relating to said first path.

4. The new path setting method according to claim 2, wherein said information to indicate whether the part or all of said network nodes are the pass points of said first path or not is added so that said second access router or said predetermined node adjacent thereto to ultimately receive said message can identify said information last added to said message.

5. The new path setting method according to claim 2, wherein an interface address of said network node used in said first path is used as said information to indicate whether or not the part or all of said network nodes are the pass points of said first path to be added to said message.

6. The new path setting method according to claim 2, wherein said method further comprises a step of transmitting a message for resource reservation to said crossover node by said second access router or by said predetermined node adjacent thereto.

7. The new path setting method according to claim 6, wherein said method further comprises a step of initiating an operation to release a path state in a part of said first path from said crossover node to said mobile terminal by said crossover node to receive said message for resource reservation.

8. The new path setting method according to claim 6, wherein said method further comprises a step of initiating an operation to update a path state in an overlapping portion of said first path and said second path from said crossover node to said predetermined correspondent node by said crossover node upon receipt of said message for resource reservation.

9. The new path setting method according to claim 2, wherein said method further comprises a step of transmitting a message for requesting resource reservation to said crossover node by said second access router or by said predetermined node adjacent thereto.

10. The new path setting method according to claim 9, wherein said method further comprises a step of initiating an operation to release a path state on a part of said first path from said crossover node to said mobile terminal by said crossover node upon receipt of said message for requesting resource reservation.

11. The new path setting method according to claim 9, wherein said method further comprises a step of initiating an operation to update a path state in an overlapping portion of said first path and said second path from said crossover node to said predetermined correspondent node by said crossover node upon receipt of said message for requesting resource reservation.

12. The new path setting method according to claim 9, wherein said method further comprises a step of initiating an operation to reserve a resource from said crossover node to said second access router or to said predetermined node adjacent thereto by said crossover node upon receipt of said message for requesting resource reservation.

13. A mobile terminal in a communication system where a plurality of access routers each constituting a subnet are connected via a communication network, said communication system being so configured that, based on a first path as set up between a predetermined correspondent node connected to said communication network and a mobile terminal connected to a first access router, a second path is set up between said predetermined correspondent node connected to said communication network and said mobile terminal under a condition where the mobile terminal is connected to said second access router when a handover is performed from said first access router to said second access router, wherein said mobile terminal comprises:
an address acquiring unit for acquiring an address of said second access router or of a predetermined node adjacent thereto; and
a message transmitting unit for transmitting a message, including information relating to said first path, to said second access router or to said predetermined node adjacent thereto under the condition where the mobile terminal is connected to said first access router.

14. A path managing device in a communication system where a plurality of access routers each constituting a subnet are connected via a communication network, wherein, said communication system being configured that, based on a first path as set between a predetermined correspondent node connected to said communication network and a mobile terminal connected to a first access router, a second path is set up between said predetermined correspondent node connected to the communication network and said mobile terminal under a condition where the mobile terminal is connected to a second access router by performing a handover from said first access router to said second access router, wherein;
said path managing device is within a network node to transfer a message including information relating to said first path to be transmitted from said mobile terminal to said second access router or to a predetermined node adjacent thereto under the condition that said mobile terminal is connected to said first access router, and wherein said path managing device comprises:
a message receiving unit for receiving said message;
an information adding unit for identifying whether or not said network node is a pass point of said first path, and for adding information to indicate that the network node is a pass point of said first path when said network node is a pass point of said first path; and
a message transmitting unit for transmitting a message added with said information to indicate that the network node is a pass point of said first path when said network node is a pass point of said first path by said information adding unit.

15. A path managing device in a communication system where a plurality of access routers each constituting a subnet are connected via a communication network, wherein, said communication system being so configured that, based on a first path as set between a predetermined correspondent node connected to said communication network and a mobile terminal connected to a first access router, a second path is set up between said predetermined correspondent node connected to the communication network and said mobile terminal under the condition where the mobile terminal is connected to a second access router by performing a handover from said first access router to said second access router, wherein:
said path managing device is in a network node configured to receive a message including information relating to said first path, and information to indicate whether or not a part or all of said network nodes are pass points of said first path is added to said message from said mobile terminal under the condition where the mobile terminal is connected to said first access router, and wherein said path managing device comprises:
a message receiving unit for receiving said message; and
a crossover node determining unit for determining crossover nodes on said first path and said second path when the path is changed from said first path to said second path by referring to the information to indicate whether or not the part or all of said network nodes are pass points of said first path added to said message by said network node.

* * * * *